(12) United States Patent
Skulason et al.

(10) Patent No.: US 12,403,980 B2
(45) Date of Patent: Sep. 2, 2025

(54) LOW TRAVEL REAR WHEEL SUSPENSION SYSTEM FOR A BIKE

(71) Applicant: LAUF CYCLES HF., Reykjavik (IS)

(72) Inventors: Benedikt Skulason, Reykjavik (IS); Bergur Benediktsson, Reykjavik (IS)

(73) Assignee: LAUF CYCLES HF., Reykjavik (IS)

( * ) Notice: Subject to any disclaimer, the term of this patent is extended or adjusted under 35 U.S.C. 154(b) by 729 days.

(21) Appl. No.: 17/640,975

(22) PCT Filed: Sep. 4, 2020

(86) PCT No.: PCT/EP2020/074806
§ 371 (c)(1),
(2) Date: Mar. 7, 2022

(87) PCT Pub. No.: WO2021/044007
PCT Pub. Date: Mar. 11, 2021

(65) Prior Publication Data
US 2022/0340230 A1  Oct. 27, 2022

(30) Foreign Application Priority Data

Sep. 6, 2019 (EP) .................................... 19195944
Nov. 18, 2019 (EP) .................................... 19209809

(51) Int. Cl.
*B62K 25/30* (2006.01)
*B62K 3/02* (2006.01)
*B62K 25/04* (2006.01)

(52) U.S. Cl.
CPC ............... *B62K 25/30* (2013.01); *B62K 3/02* (2013.01); *B62K 2025/041* (2013.01)

(58) Field of Classification Search
CPC .... B62K 25/30; B62K 3/02; B62K 2025/041; B62K 25/04; B62K 25/28; B62K 19/18;
(Continued)

(56) References Cited

U.S. PATENT DOCUMENTS 6,109,637 A * 8/2000 Kirk .................. B62K 25/04
  267/153
8,540,267 B1 9/2013 Chubbuck et al.
(Continued)

FOREIGN PATENT DOCUMENTS

DE 202017005686 U1 2/2019
EP     1060979 A2 12/2000
(Continued)

OTHER PUBLICATIONS

Search Report from corresponding European Application No. EP19195944, Feb. 12, 2020.
(Continued)

*Primary Examiner* — Valentin Neacsu
*Assistant Examiner* — Nabin Kumar Sharma
(74) *Attorney, Agent, or Firm* — Workman Nydegger

(57) ABSTRACT

A low travel rear wheel suspension system for a bike includes a seat tube, left and right side flexible chainstays each with its front end attached to the seat tube, left side and right side seatstay. In the area of the seat tube where it connects to the seatstays, the seat tube is split up into a seat tube posterior part and a seat tube anterior part, the seatstays connecting to the seat tube posterior part, and the seatstays not connecting directly to the seat tube anterior part. The seat tube posterior part and the seat tube anterior part connect to one another both above and below a seat tube cavity. The seat tube posterior part and the seat tube anterior part are configured to allow flex of the seat tube posterior part towards the seat tube anterior part, and thus allow vertical flex of the flexible chainstays.

14 Claims, 30 Drawing Sheets

(58) Field of Classification Search
CPC .. B62K 19/30; B62K 2025/048; B62K 25/06; B62K 25/286; B62M 9/00
USPC .................................. 280/284, 288; 267/132
See application file for complete search history.

(56) References Cited

U.S. PATENT DOCUMENTS

| | | | |
|---|---|---|---|
| 9,580,134 B2 * | 2/2017 | McAndrews | B62K 25/04 |
| 2004/0160036 A1 | 8/2004 | Perez | |
| 2012/0098233 A1 | 4/2012 | Groendal | |
| 2014/0265231 A1 * | 9/2014 | D'Aluisio | B62K 25/28 |
| | | | 280/284 |
| 2014/0265406 A1 | 9/2014 | Huber et al. | |
| 2015/0353163 A1 | 12/2015 | Skúlason | |
| 2016/0332687 A1 | 11/2016 | Hartung et al. | |
| 2016/0339985 A1 | 11/2016 | Lund et al. | |

FOREIGN PATENT DOCUMENTS

| | | |
|---|---|---|
| EP | 2960145 A2 | 12/2015 |
| FR | 3052433 A1 | 12/2017 |
| WO | 2014151699 A1 | 9/2014 |

OTHER PUBLICATIONS

International Search Report and Written Opinion from PCT Application No. PCT/EP2020/074806, Nov. 18, 2020.
Search Report from Chinese Application No. 202080072517.5, Sep. 4, 2020.

* cited by examiner

LOW TRAVEL REAR WHEEL SUSPENSION SYSTEM FOR A BIKE

FIELD OF THE INVENTION

The present invention relates to a low travel rear wheel suspension system for a bike (bicycles and motorbikes), and to a bike comprising such a vehicle suspension system.

BACKGROUND OF THE INVENTION

Today's rear wheel suspension systems (in contrast to saddle suspension systems such as but not limited to; flexible seatposts, linkage suspension seatposts, suspension saddles, Trek's IsoSpeed® rear system or in general bike frames designed to provide increased seatpost flex) for bikes (bicycles and motorbikes) can mostly be categorized into 3 key categories:

1. 4-bar linkage suspension systems, as seen on most modern "hard-hitting" mountain bikes. Examples are DW-link®, Niner's CVA®, equipped bikes etc. These systems, when designed correctly, can provide a high degree of suspension dynamics control and/or tuneability while being stiff laterally. These systems however require a supplemental suspension unit (spring of some sort, usually a telescopic coil or air spring with its associated added friction) and further pivots and links to connect and guide the required supplemental suspension unit. These systems are relatively heavy, require substantial maintenance and add complexity to a bike, it's therefore logical to only apply them when substantial suspension travel is needed/desired (this usually means rear wheel travel of above 100 mm). Since these systems are generally designed around the said substantial travel, a damping unit (usually housed within the suspension unit) is also needed in order to "kill" some of the energy the system is charged with during an impact, and thus prevent a violent rebound that would otherwise cause a cyclist discomfort or him to lose control.
2. "Single pivot" suspension systems, as seen on lighter cross-country mountain bikes such as Scott Spark® and Specialized Epic® bikes. These systems generally have far more pivots than just the one implied in their name, however the suspension path of the rear wheel is mostly dictated by a single pivot that is generally placed close to the bottom bracket of its bike. Hence, the name. Further pivots and links are required to connect and guide the required supplemental suspension unit (spring of some sort, usually a telescopic coil or air spring with its associated added friction) this adds substantial weight and maintenance. These "single pivot" systems are generally lighter than "4-bar linkage" systems but offer less control and tuneability of suspension dynamics. Therefore "single pivot" systems are usually used for lower travel applications than "4-bar linkage" systems. However, the weight, maintenance and complexity addition compared to a non-suspended bike frame is still substantial and therefore this solution is rarely used for less than 70 mm of rear wheel travel. Since these systems are generally designed around the said substantial travel, a damping unit (usually housed within the suspension unit) is also needed in order to "kill" some of the energy the system is charged with during an impact, and thus prevent a violent rebound that would otherwise cause a cyclist discomfort or him to lose control. A notable variation of "Single pivot" rear suspension is the one used on previous generation(s) of Cannondale Scalpel bikes where the pivot usually placed close to the bottom bracket was replaced by a flex-zone (living hinge) on the chainstays. In other aspects, these bikes were designed like "single pivot" bikes (with several pivots to connect and guide a telescopic suspension unit) and therefore the general pros/cons associated with "single pivot" suspension frame designs are still valid.
3. Flexible chainstays and seatstays combined with a telescopic suspension unit, without supplemental means of guiding its telescopic suspension units. Hereafter called FlexTelSus in this document. While the "single pivot" systems described above have pivots and links to guide their telescopic suspension unit. FlexTelSus systems include BMC's MTT®, Moot's YBB® and HiRide's ESAS® (as seen on Pinarello Dogma K10s®) rear suspension suspension systems (although ESAS is a slight variation, having an additional pivot above its telescopic suspension unit). These systems are simpler and lighter than aforementioned "single pivot" systems but offer little control of the suspension dynamics and the omission of supplemental links and pivots guiding the suspension unit can result in high stresses and associated high friction in the sliding surfaces of said suspension unit. As a result, these systems are generally not considered to be a good solution for smooth long-stroke suspension. They are therefore generally considered limited to a shorter travel (usually 10-35 mm of rear wheel travel). To change the spring rate of these systems they generally offer replaceable elastomers and or springs but stiffness cannot be tuned in a simpler/quicker manner or on the fly. As these systems include telescopic sliding surfaces, they require maintenance of associated friction surfaces, where said friction can also prevent smooth suspension action. The HiRide ESAS® offers a remote lockout function through the use of a hydraulic valve, but suspension stiffness cannot be altered "on the fly".

The inventor of the present invention has appreciated that there is thus a need for an improved low travel rear wheel suspension system for bikes. In particular, one that offers an appealing combination of adjustability, low friction, low weight, low maintenance, low manufacturing complexity and pleasing aesthetics. "Low travel" defined to be up to approx. 40 mm of rear wheel suspension.

SUMMARY OF THE INVENTION

It would be advantageous to achieve an improved low travel rear wheel suspension system for bikes. In particular, one that offers an appealing combination of adjustability, low friction, low weight, low maintenance and pleasing aesthetics. "Low travel" defined to be up to approx. 40 mm of rear wheel suspension.

In general, the invention preferably seeks to mitigate, alleviate or eliminate one or more of the above-mentioned disadvantages of the prior art, singly or in any combination. In particular, it may be seen as an object of the present invention to provide a low travel rear wheel suspension system that solved the above-mentioned problems, or other problems, of the prior art.

To better address one or more of these concerns, in a first aspect of the invention a low travel rear wheel suspension system (101) for a bike (where left and right sides of said bike are defined by the conventional non-driveside and driveside respectively of said bike), the bike comprising:

a rear wheel (110), the low travel rear wheel suspension system (101) comprising:

a seat tube (104), a left side flexible chainstay (102) and a right side flexible chainstay (103), each with its front end attached to the seat tube (104) of said bike less than 250 mm from the rotational axis (105) of a bottom bracket shell (106) of said bike, said bottom bracket shell defined to be a part of said seat tube, a left side seatstay (107) and a right side seatstay (108), each having its lower end areas connected to the posterior end areas of each of said flexible chainstays, and each of said seatstays extending upwards and forward with its other end connecting to the seat tube of said bike, in the area where said flexible chainstays and said seatstays connect, a set of dropouts (109) to rotably connect to a rear wheel (110) of said bike, said dropouts can be integral parts of said flexible chainstays and/or said seatstays, or they can be mounted to said flexible chainstays and/or said seatstays through any release fastening elements, in the area of said seat tube where it connects to said seatstays, said seat tube is split up into a seat tube posterior part (111) and a seat tube anterior part (112), said seatstays connecting to said seat tube posterior part, said seatstays not connecting directly to said seat tube anterior part, the area between said seat tube posterior part and said seat tube anterior part defined as seat tube cavity (113), said seat tube posterior part and said seat tube anterior part connecting to one another both above and below said seat tube cavity, where said seat tube posterior part and said seat tube anterior part are configured to allow flex of said seat tube posterior part towards said seat tube anterior part, and thus allow vertical flex of said flexible chainstays.

Thus, providing vertical suspension of said rear wheel, with good resistance to lateral forces without the use of pivots or sliding surfaces, thus enabling light weight constructions while requiring little or no maintenance. Said vertical suspension being mostly frictionless and thus not requiring large impacts to overcome initial stiction, thereby being very effective at absorbing small hits during riding.

In one embodiment of said low travel rear wheel suspension system, said left side flexible chainstay and said right side flexible chainstay, said left side seatstay and said right side seatstay, said seat tube comprising said seat tube posterior part and said seat tube anterior part of said low travel rear wheel suspension system are all a part of the same non-disassemblable body, this can for example, but not limited to, be achieved by monocoque composite material manufacturing techniques, by bonding of composite material parts or by welding of metal parts.

Thus, no screws, bolts, rivets, pivots, etc. between these parts are adding to the complexity, weight, friction and/or maintenance of the system.

In one embodiment of said low travel rear wheel suspension system, said left side flexible chainstay and said right side flexible chainstay, said left side seatstay and said right side seatstay, said seat tube comprising said seat tube posterior part and said seat tube anterior part of said low travel rear wheel suspension system are made of more than one disassemblable bodies, this can for example, but not limited to, be achieved by bolting together, snapping into place, etc.

Thus, facilitating replaceable components, transition between different materials, easy component supply between companies, etc.

In one embodiment of said low travel rear wheel suspension system, said seat tube posterior part is shaped to act as a leaf spring, i.e. is shaped substantially thinner than it is wide or long.

In one embodiment of said rear wheel suspension system, said seat tube posterior part has a solid cross section.

Thus, achieving maximal flexural performance, i.e. weight carrying capacity for a certain amount of possible flex, for a given thickness.

In one embodiment of said rear wheel suspension system, said seat tube posterior part has a hollow cross section.

Thus, allowing for manufacturing methods such as composite material bladder pressured molding and or allowing for a lower weight design.

In one embodiment of said low travel rear wheel suspension system, said seat tube posterior part and said seat tube anterior part are formed so that the effective spring length of said seat tube posterior part is shortened as the said low travel rear wheel suspension system compresses, by said seat tube posterior part coming into contact with said seat tube, notably the seat tube anterior part.

Thus, making for a progressive spring rate suspension system, this being a benefit for riders who want extra sensitive suspension for smaller hits, while having stiffer suspension deeper into the suspension travel.

In one embodiment of said low travel rear wheel suspension system, at least half of the length of said seat tube posterior part is at any given location less than 20° from being parallel to the seat tube angle of said bike comprising said low travel rear wheel suspension system.

Thus, enabling said seat tube posterior part to conform well to the natural shape and orientation of said seat tube, conserving fairly traditional aesthetics while also providing flex that effectively results in vertical flex of said chainstays, thus providing vertical suspension of said rotably attached rear wheel.

In one embodiment of said low travel rear wheel suspension system, the entire length of said seat tube posterior part is at any given location less than 20° from being parallel to the seat tube angle of said bike comprising said low travel rear wheel suspension system.

Thus, enabling said seat tube posterior part to conform well to the natural shape and orientation of said seat tube, conserving fairly traditional aesthetics while also providing flex that effectively results in vertical flex of said chainstays, thus providing vertical suspension of said rotably attached rear wheel.

In one embodiment of said low travel rear wheel suspension system, said seat tube cavity has height of between 5 cm and 25 cm, such as between 10 cm and 25 cm.

Thus, providing sufficient length of said seat tube posterior part to provide desired suspension function while still fitting into the available space in conventional seat tubes on modern road bike frames.

In one embodiment of said low travel rear wheel suspension system, said seatstays connect to said seat tube posterior part substantially in the height center area of said seat tube posterior part.

Thus, optimizing the combined spring contribution, i.e. maximizing flexibility while being able to carry a certain weight at a certain suspension displacement, of the 2 effective leaf springs of said seat tube posterior part that are; 1. Below the connection to said seatstays and 2. Above the connection to said seatstays.

In one embodiment of said low travel rear wheel suspension system, the width of said seat tube posterior part at any given height above ground location is, when looked at from the front, within 10 mm of the width of said seat tube anterior part in the same height above ground location.

Thus, achieving good flexural performance, i.e. being able to carry high weight over a large displacement at a good stiffness in the intended flex direction, and good lateral stiffness of said seat tube posterior part with limited obtrusiveness and limited added air resistance.

In one embodiment of said low travel rear wheel suspension system, said low travel rear wheel suspension system further comprises one or more stiffness adjustment inserts, arranged and secured in place between said seat tube posterior part and said seat tube anterior part, said one or more stiffness adjustment inserts being secured in place by any applicable fastening methods.

Thus, riders of different body weight and/or with different riding preferences may shorten the effective spring length of said seat tube posterior part and thus increase the spring rate of said low travel rear wheel suspension system.

In one embodiment of said low travel rear wheel suspension system, one or more of said one or more stiffness adjustment inserts are each contacting both said seat tube posterior part and said seat tube anterior part when rider is stationary in riding position on said bike.

Thus, changing the initial stiffness of the said low travel rear wheel suspension system.

In one embodiment of said low travel rear wheel suspension system, one or more of said one or more stiffness adjustment inserts are each contacting only either said seat tube posterior part or said seat tube anterior part when rider is stationary in riding position on said bike, then each contacting both said seat tube posterior part and said seat tube anterior part when said low travel rear wheel suspension system is further compressed into its suspension travel.

Thus, when only partially reaching between said seat tube posterior part and said seat tube anterior part said one or more stiffness adjustment inserts can make for a progressive spring rate suspension system, as the said one or more inserts can come into contact with both sides when the suspension system has partially compressed and thereby decreasing the effective spring length, this is a benefit for riders who want extra sensitive suspension for smaller hits, while having stiffer suspension deeper into the suspension travel.

In one embodiment of said low travel rear wheel suspension system, one or more of said one or more stiffness adjustment inserts are elevatable in a direction substantially perpendicularly to said seat tube posterior part, either secured to said seat tube posterior part and adjustable in how far they are elevated towards said seat tube anterior part, or secured to said seat tube anterior part and adjustable in how far they are elevated towards said seat tube posterior part, said one or more stiffness adjustment inserts being secured in place by any applicable fastening method.

Thus, when fully reaching the opposite side, with a rider stationary in riding position on said bike, shortening the effective spring length of said seat tube posterior part and thus stiffening the suspension, making it suit riders preferring stiffer suspension, when partially reaching the opposite side the said elevatable stiffness adjustment insert can make for a progressive spring rate suspension system, as the said elevatable stiffness adjustment insert comes into contact with the opposite side when the suspension system has partially compressed, this is a benefit for riders who want extra sensitive suspension for smaller hits, while having stiffer suspension deeper into the suspension travel.

In one embodiment of said low travel rear wheel suspension system comprising said one or more elevatable stiffness adjustment inserts, one or more of said one or more elevatable stiffness adjustment inserts can be elevated by actuators such as, but not limited to, hydraulic pistons, screw jacks, etc. Said actuators can, e.g. but not limited to, be manually operated via buttons, levers, turn knobs, dials or with a tool such as an Allen key or screwdriver. Operation of said actuators can be via a cable- or hydraulically connected remote, furthermore, said actuators can e.g. be driven by electric motors, either controlled via an electrical wire connected remote or via a wireless remote. Said cable-, hydraulic-, electrical wire- or electrical wireless-remotes can for instance be mounted on the handlebar of said bike.

In one embodiment of said low travel rear wheel suspension system, said seat tube posterior part is substantially parallel to the adjacent surface of said seat tube anterior part on; the lengthwise portion of said seat tube posterior part that reaches from where said seat tube posterior part connects to remainder of said seat tube at the lower end of said seat tube cavity and from there upwards along the length of said seat tube anterior part at least 30% of the way to where it connects to said seatstays, and/or, the lengthwise portion of said seat tube posterior part that reaches from where said seat tube posterior part connects to remainder of said seat tube at the upper end of said seat tube cavity and from there downwards along the length of said seat tube anterior part at least 30% of the way to where it connects to said seatstays.

In one embodiment of said low travel rear wheel suspension system, said seat tube posterior part is substantially parallel to the adjacent surface of said seat tube anterior part on; the lengthwise portion of said seat tube posterior part that reaches from where said seat tube posterior part connects to remainder of said seat tube at the lower end of said seat tube cavity and from there upwards along the length of said seat tube anterior part at least 30% of the way to where it connects to said seatstays, and/or, the lengthwise portion of said seat tube posterior part that reaches from where said seat tube posterior part connects to remainder of said seat tube at the upper end of said seat tube cavity and from there downwards along the length of said seat tube anterior part at least 30% of the way to where it connects to said seatstays, in this said substantially parallel lengthwise portion the substantially perpendicular distance between said seat tube posterior part and said seat tube anterior part being between 1 mm and 30 mm, such as 5-30 mm.

Thus, creating "real estate" for slidable stiffness adjustment inserts between said seat tube posterior part and said seat tube anterior part. Said slidable stiffness adjustment inserts able to slide upwards and downwards along said seat tube posterior part and said seat tube anterior part to tune the stiffness of said low travel rear wheel suspension system.

In one embodiment of said low travel rear wheel suspension system, one or more of said one or more stiffness adjustment inserts are slidable upwards and downwards along and between said seat tube posterior part and said seat tube anterior part, said one or more slidable stiffness adjustment inserts being guided to prevent lateral movement, when rider is stationary in riding position on said bike said one or more slidable stiffness adjustment inserts can either reach entirely between said seat tube posterior part and said seat tube anterior part, or reach partially between said seat tube posterior part and said seat tube anterior part.

Thus, when reaching entirely between said seat tube posterior part and said seat tube anterior part shortening the effective spring length of said seat tube posterior part and thus stiffening the suspension, when partially reaching between the said seat tube posterior part and said seat tube anterior part the said one or more slidable stiffness adjustment inserts can make for a progressive spring rate suspension system, as the said insert achieves contacts with both said seat tube posterior part and said seat tube anterior part when the suspension system has partially compressed, this is a benefit for riders who want extra sensitive suspension for smaller hits, while having stiffer suspension deeper into the suspension travel. Being slidable upwards/downwards can enable a rider to conveniently adjust his suspension according to his preference.

In one embodiment of said low travel rear wheel suspension system, comprising one or more slidable stiffness adjustment inserts, one or more of said one or more slidable stiffness adjustment inserts comprise a mechanically gripping texture A that interacts with a matching opposing mechanically gripping texture B on said seat tube posterior part and/or said seat tube anterior part, said one or more mechanically gripping slidable stiffness adjustment inserts further comprising means of pressuring said opposing mechanically gripping textures A and B together, said pressuring may be done via, but not limited to, spring loading, screw tightening, etc.

Thus, preventing said one or more mechanically gripping slidable stiffness adjustment inserts from slipping unintentionally upwards or downwards along said seat tube posterior part and said seat tube anterior part during riding of said bike.

In one embodiment of said low travel rear wheel suspension system, said pressuring of said opposing mechanically gripping textures A and B together is achieved through a spring-loaded lever, where pushing or pulling the lever levitates said pressure and thus allows said slidable stiffness adjustment insert to be slid upwards or downwards while lever is pushed or pulled.

In one embodiment of said low travel rear wheel suspension system comprising said one or more slidable stiffness adjustment inserts, said rear wheel suspension system further comprises a linear actuator for sliding one or more of said one or more slidable stiffness adjustment inserts upwardly and downwardly. Said linear actuator can e.g. be a screw jack, scissor drive, rack and pinion drive, hydraulic actuator, pneumatic actuator, pullable wire plus retracting spring combo, etc.

In one embodiment of said low travel rear wheel suspension system comprising said linear actuator, said linear actuator is arranged in a groove that runs up and down the posterior surface of said anterior part of said seat tube (with the notable exclusion of a scissor drive linear actuator, as it would not easily fit in a groove).

Thus, moving said linear actuator out of the way from a flexing said posterior part of said seat tube, allowing it to flex more than otherwise possible.

In one embodiment of said low travel rear wheel suspension system comprising said linear actuator, where said linear actuator is arranged in a groove that runs up and down the posterior surface of said anterior part of said seat tube (with the notable exclusion of a scissor drive linear actuator, as it would not easily fit in a groove) said one or more of said one or more slidable stiffness adjustment inserts have an extrusion shaped to interact laterally with the surface of said groove.

Thus, simultaneously moving said linear actuator out of the way from a flexing said posterior part of said seat tube, allowing it to flex more than otherwise possible, and preventing lateral movement of said one or more slidable inserts.

In one embodiment of said low travel rear wheel suspension system, comprising one or more slidable stiffness adjustment inserts, one or more of said one or more slidable stiffness adjustment inserts comprise a wheel or pinion that interacts with cogged or toothed bars or rails that are fixed to said seat tube posterior part and/or said seat tube anterior part and extend upwards/downwards along said seat tube posterior part and/or said seat tube anterior part.

Thus, by turning said wheel or pinion driving said one or more slidable stiffness adjustment inserts upwards/downwards, said wheel or pinion moving upwards/downwards with said slidable stiffness adjustment insert, and thus altering the stiffness of said low travel rear wheel suspension system by shortening/lengthening the effective spring length of said seat tube posterior part.

In one embodiment of said low travel rear wheel suspension system, comprising said wheel or pinion on one or more of said one or more slidable stiffness adjustment inserts, said wheel or pinion is connected to a drive mechanism operated via, but not limited to, a button, a lever, a turn knob, a dial or via a tool such as an allen key or screwdriver, operation can e.g. be via a cable- or hydraulically connected remote, or in the case when said drive mechanism is powered by one or more electric motors, either via electrical-wire connected remote or via wireless remote, said remotes, weather they are connected by a cable-, hydraulic line, electrical wire- or electrical wireless communications, can for instance be mounted on the handlebar of said bike.

In one embodiment of said low travel rear wheel suspension system, comprising one or more slidable stiffness adjustment inserts, one or more of said one or more slidable stiffness adjustment inserts comprise one or more cogged or toothed bars or rails that extend upwards or downwards from said one or more of said one or more slidable stiffness adjustment inserts substantially along said seat tube posterior part and/or said seat tube anterior part, said seat tube posterior part and/or said seat tube anterior part comprising a wheel or pinion that interacts with said one or more cogged or toothed bars or rails.

Thus, by turning said wheel or pinion driving said one or more slidable stiffness adjustment inserts up/down, while said wheel or pinion does not move upwards/downwards itself relatively to said seat tube posterior part and/or said seat tube anterior part, and thus altering the stiffness of said low travel rear wheel suspension system by shortening/lengthening the effective spring length of said seat tube posterior part.

In one embodiment of said low travel rear wheel suspension system, comprising one or more slidable stiffness adjustment inserts, one or more of said one or more slidable stiffness adjustment inserts comprise one or more cogged or toothed bars or rails that extend downwards or upwards from said one or more of said one or more slidable stiffness adjustment inserts substantially along said seat tube posterior part and/or said seat tube anterior part and then extending further through an opening at top or bottom of said seat tube cavity, into a second cavity in said seat tube, said seat tube posterior part and/or said seat tube anterior part comprising a wheel or pinion that interacts with said one or more cogged or toothed bars or rails.

Thus, said opening at the top or bottom of said seat tube cavity facilitates said cogged or toothed bars to move into said opening thus allowing associated said one or more slidable stiffness adjustment insert to be slid closer to the respective top or bottom of said cavity.

In one embodiment of said low travel rear wheel suspension system, comprising one or more slidable stiffness adjustment inserts, one or more of said one or more slidable stiffness adjustment inserts comprise one or more cogged or toothed bars or rails that extend downwards or upwards from said one or more of said one or more slidable stiffness adjustment inserts substantially along said seat tube posterior part and/or said seat tube anterior part and then extending further through an opening at top or bottom of said seat tube cavity, into a second cavity in said seat tube, said second cavity in said seat tube comprising a wheel or pinion that interacts with said one or more cogged or toothed bars or rails, said second cavity in said seat tube also comprising an associated drive mechanism of said wheel or pinion.

Thus, by housing said wheel or pinion and associated drive mechanism in said second cavity, aforementioned components can be neatly nested in said second cavity, offering good protection from the elements and hits, good fastening options to said cavity of said seat tube, and last but not least, neatly keeping said components away from the valuable space used for flex of said seat tube posterior part.

In one embodiment of said low travel rear wheel suspension system, where said wheel or pinion located on; said seat tube posterior part, said seat tube anterior part or in said second cavity in said seat tube, is connected to a drive mechanism operated via, but not limited to, buttons, levers, turn knobs, dials or with a tool such as an allen key or screwdriver, operation can e.g. be via a cable- or hydraulically connected remote, or in the case when said drive mechanism is driven by one or more electric motors, either via electrical-wire connected remote or via wireless remote. Said remotes, weather they are connected by a cable-, hydraulic line, electrical wire- or electrical wireless communications, can for instance be mounted on the handlebar of said bike.

In one embodiment of said low travel rear wheel suspension system comprising one or more slidable stiffness adjustment inserts, one or more of said one or more slidable stiffness adjustment inserts can be slid upwards/downwards by a screw jack actuator.

In one embodiment of said low travel rear wheel suspension system comprising one or more slidable stiffness adjustment inserts, one or more of said one or more slidable stiffness adjustment inserts can be slid upwards/downwards by a linear hydraulic actuator.

In one embodiment of said low travel rear wheel suspension system, said linear hydraulic actuators or said screw jack actuators can, e.g. but not limited to, be manually operated via buttons, levers, turn knobs, dials or with a tool such as an allen key or screwdriver. Operation of said actuators can be via a cable- or hydraulically connected remote. Furthermore, said actuators can e.g. be driven by electric motors, either controlled via an electrical wire connected remote or via a wireless remote. Said cable-, hydraulic-, electrical wire- or electrical wireless-remotes can for instance be mounted on the handlebar of said bike.

In one embodiment of said low travel rear wheel suspension system comprising said linear hydraulic actuator, said linear hydraulic actuator extends upwards or downwards from said one or more of said one or more slidable stiffness adjustment inserts and then connects its other end to said seat tube.

In one embodiment of said low travel rear wheel suspension system comprising said linear hydraulic actuator, said linear hydraulic actuator extends downwards or upwards from said one or more of said one or more slidable stiffness adjustment inserts and then extending further through an opening at top or bottom of said seat tube cavity, into a second cavity in said seat tube.

Thus, said opening at the top or bottom of said seat tube cavity facilitates said linear hydraulic actuator to extend into said opening thus allowing associated said one or more slidable stiffness adjustment insert to be slid closer to the respective top or bottom of said cavity.

In one embodiment of said low travel rear wheel suspension system comprising said screw jack actuator, said screw jack actuator extends upwards or downwards from said one or more of said one or more slidable stiffness adjustment inserts and then connects its other end to said seat tube.

In one embodiment of said low travel rear wheel suspension system comprising said screw jack actuator, said screw jack actuator extends downwards or upwards from said one or more of said one or more slidable stiffness adjustment inserts and then extending further through an opening at top or bottom of said seat tube cavity, into a second cavity in said seat tube.

Thus, said opening at the top or bottom of said seat tube cavity facilitates said screw jack actuator to extend into said opening thus allowing associated said one or more slidable stiffness adjustment insert to be slid closer to the respective top or bottom of said cavity.

In one embodiment of said low travel rear wheel suspension system, said seat tube cavity and/or said second cavity in said seat tube are protected by removable or non-removable covers on its left and/or right sides.

In one embodiment of said low travel rear wheel suspension system, said second cavity in said seat tube is made up by two tube shapes extending upwards/downwards, one of the tube shapes being posterior to said second cavity in said seat tube and the other tube shape being anterior to said second cavity in said seat tube, the two tube shapes connecting together above and below said second cavity in said seat tube.

In one embodiment of said low travel rear wheel suspension system, comprising one or more stiffness adjustment inserts, one or more of said one or more stiffness adjustment inserts are formed so that the thickness of said one or more of said one or more stiffness adjustment inserts at the end that further from connection of said seat stays and said seat tube posterior part is such that, when rider is stationary in riding position on said bike, it reaches entirely between said seat tube posterior part and said seat tube anterior part, while its thickness at the end closer to the connection of said seat stays and said seat tube posterior part is such that it lacks up to 5 mm to reach entirely between said seat tube posterior part and said seat tube anterior part.

This can make each of said one or more of said one or more stiffness adjustment inserts provide more than one spring rate for said low travel rear wheel suspension system, i.e. providing progressive stiffness. Stiffness ramping up as the end further away from the intersection of said seat stays and said seat tube posterior part comes in contact with both said seat tube posterior part and said seat tube anterior part, as the said suspension system has been partially compressed.

In one embodiment of said low travel rear wheel suspension system comprising said one or more stiffness adjustment inserts, said low travel rear wheel suspension system further comprises a liner material fully or partially covering surfaces of said seat tube posterior part, seat tube anterior part and/or said second cavity that otherwise could come into contact with each other and or into contact with one or more of said one or more stiffness adjustment inserts, said liner material can be made of, but is not limited to, a plastic or elastomer material, said liner material is defined to become a part of the body it is attached to, whether it being said seat tube posterior part, said seat tube anterior part or said second cavity.

Thus, protecting said seat tube posterior part and/or seat tube anterior part from friction and/or wear and potentially providing a smoother engagement of said one or more stiffness adjustment inserts.

In one embodiment of said low travel rear wheel suspension system, an elastomer bump stop is located and secured in place in said seat tube cavity.

Thus, enabling said low travel rear wheel suspension system design with a relatively low spring rate without it resulting in harsh bottom outs.

In one embodiment of said low travel rear wheel suspension system, said low travel rear wheel suspension system further comprises a forwardly extending damper arranged from said seat tube posterior part to said seat tube anterior part.

Thus, further control of the dynamics of the suspension is provided by means of absorbing compression and/or rebound energy, this becomes desirable when said low travel rear wheel suspension system is used to achieve relatively long travel suspension.

In one embodiment of said low travel rear wheel suspension system, said left side flexible chainstay and said right side flexible chainstay connect to said seat tube between 100 mm and 250 mm above the rotational axis of the bottom bracket area of said bike, both said left side flexible chainstay and said right side flexible chainstay connecting to said seat tube at substantially the same height.

Thus, potentially freeing up space to fit wider tires on said bike without said tires interfering with crankset of said bike, and furthermore changing the movement path of the suspended said rear wheel so that the movement is more directed rearwards than it would otherwise be if chainstays were connected lower to said seat tube, this can help with small bump compliance and it can also help reducing pedal bob, as chain tension can work against the suspension movement of said low travel rear wheel suspension system in this configuration.

In one embodiment of said low travel rear wheel suspension system, said one or more stiffness adjustment inserts have their widths extending at least essentially between the left and right edge of said seat tube posterior part.

Thus, an adjustable low travel rear wheel suspension system is provided that does not roll excessively to the sides when the rider is pedaling or maneuvering.

According to a second aspect, the present invention relates to a bike comprising said low travel rear wheel suspension system.

Throughout this document a bike can mean; a conventional pedal powered bicycle, motor assisted pedal powered bicycle or a motor bike.

Throughout this document it is assumed that the bike, including said low travel suspension system, is unless otherwise specified in an upright position with both front and rear wheels resting on horizontal ground with the rotational axis of the wheels parallel to the ground.

Throughout this document said seatstays are not to be understood as being fully rigid non-flexible structures. Said seatstays are e.g. to be understood as being shaped roughly according to common practice in today's bicycles. This way, said seatstays preferably flex a bit during the suspension movement of said low travel rear wheel suspension system, thus decreasing required strain on said flexible chainstays and/or said seat tube posterior part.

Throughout this document said flexible chainstays are not to be understood as being excessively flexible structures or unnecessarily outlandishly shaped. Said flexible chainstays are e.g. to be understood as being shaped roughly according to common practice in today's bicycles, but potentially slightly lower in build height than most commonly seen, to allow for more vertical flex.

Throughout this document, said seatstays, said chainstays, said dropout, said seat tube and said one or more stiffness adjustment inserts can be made out of, but not limited to being made out of, e.g. composite materials such as epoxy reinforced carbon fiber or glass fiber, aluminum, steel, titanium, magnesium, plastic materials, elastomers, wood, etc.

In general, the various aspects of the invention may be combined and coupled in any way possible within the scope of the invention. These and other aspects, features and/or advantages of the invention will be apparent from and elucidated with reference to the embodiments described hereinafter.

DESCRIPTION OF EMBODIMENTS

The present invention relates to an improved low travel rear wheel suspension system. In particular, one that offers an appealing combination of adjustability, low friction, low weight, low maintenance and pleasing aesthetics. In particular, in low travel configurations (up to approx. 40 mm of rear wheel suspension).

Figure 1:
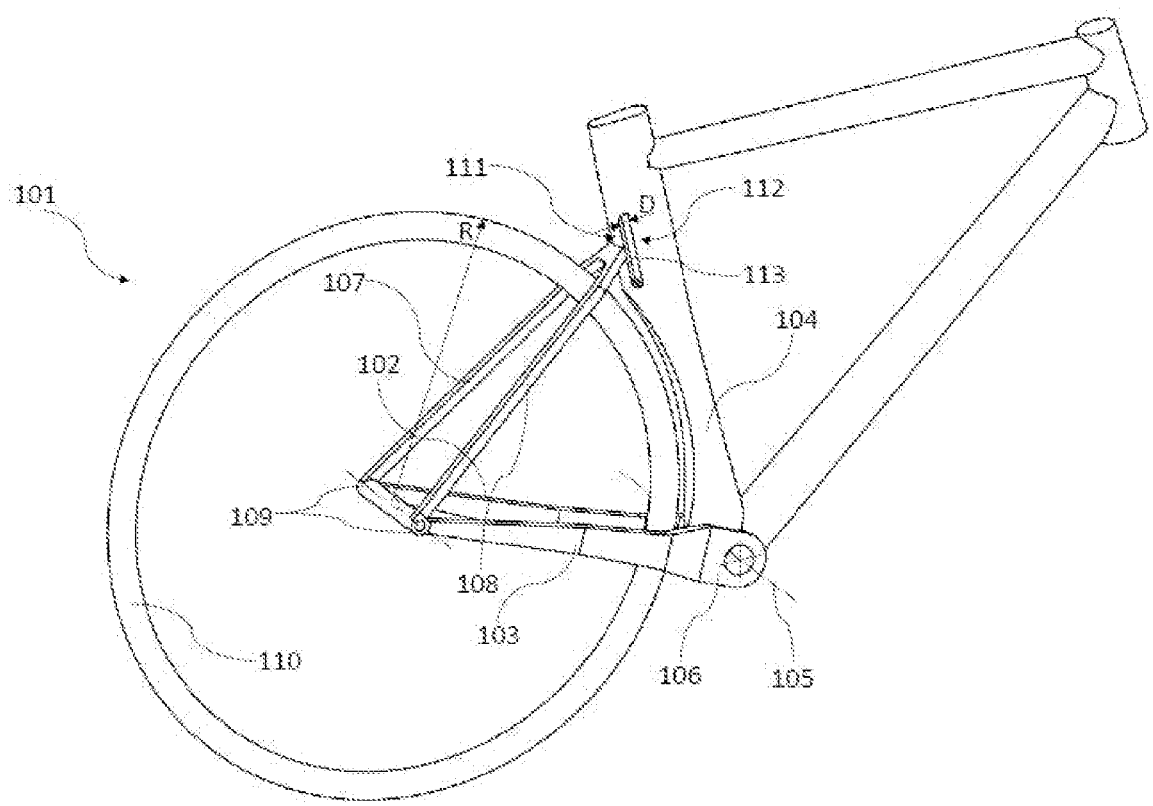
FIGS. 1-6 show embodiments of non-adjustable versions of the present invention.

FIG. 1 shows an embodiment of a low travel rear wheel suspension system (101) for a bike (where left and right sides of said bike are defined by the conventional non-driveside and driveside respectively of said bike), the bike comprising:
- a rear wheel (110),
- the low travel rear wheel suspension system (101) comprising:
  - a seat tube (104),
  - a left side flexible chainstay (102) and a right side flexible chainstay (103), each with its front end attached to the seat tube (104) of said bike less than 250 mm from the rotational axis (105) of a bottom bracket shell (106) of said bike, said bottom bracket shell defined to be a part of said seat tube,
  - a left side seatstay (107) and a right side seatstay (108), each having its lower end areas connected to the posterior end areas of each of said flexible chainstays, and each of said seatstays extending upwards and forward with its other end connecting to the seat tube of said bike,
  - in the area where said flexible chainstays and said seatstays connect, a set of dropouts (109) to rotably connect to a rear wheel (110) of said bike, said dropouts can be integral parts of said flexible chainstays and/or said seatstays, or they can be mounted to said flexible chainstays and/or said seatstays through any release fastening elements, in the area of said seat tube where it connects to said seatstays, said seat tube is split up into a seat tube posterior part (111) and a seat tube anterior part (112), said seatstays connecting to said seat tube posterior part, said seatstays not connecting directly to said seat tube anterior part, the area between said seat tube posterior part and said seat tube anterior part defined as seat tube cavity (113), said seat tube posterior part and said seat tube anterior part connecting to one another both above and below said seat tube cavity, where said seat tube posterior part and said seat tube anterior part are configured to allow flex of said seat tube posterior part towards said seat tube anterior part, and thus allow vertical flex of said flexible chainstays.

Thus, providing vertical suspension of said rear wheel, with good resistance to lateral forces without the use of pivots or sliding surfaces, thus enabling light weight constructions while requiring little or no maintenance. Said vertical suspension being mostly frictionless and thus not requiring large impacts to overcome initial stiction, thereby being very effective at absorbing small hits during riding.

In one embodiment of said low travel rear wheel suspension system, said left side flexible chainstay and said right side flexible chainstay, said left side seatstay and said right side seatstay, said seat tube comprising said seat tube posterior part and said seat tube anterior part of said low travel rear wheel suspension system are all a part of the same non-disassemblable body, this can for example, but not limited to, be achieved by monocoque composite material manufacturing techniques, by bonding of composite material parts or by welding of metal parts.

Thus, no screws, bolts, rivets, pivots, etc. between these parts are adding to the complexity, weight, friction and/or maintenance of the system.

Figure 2:
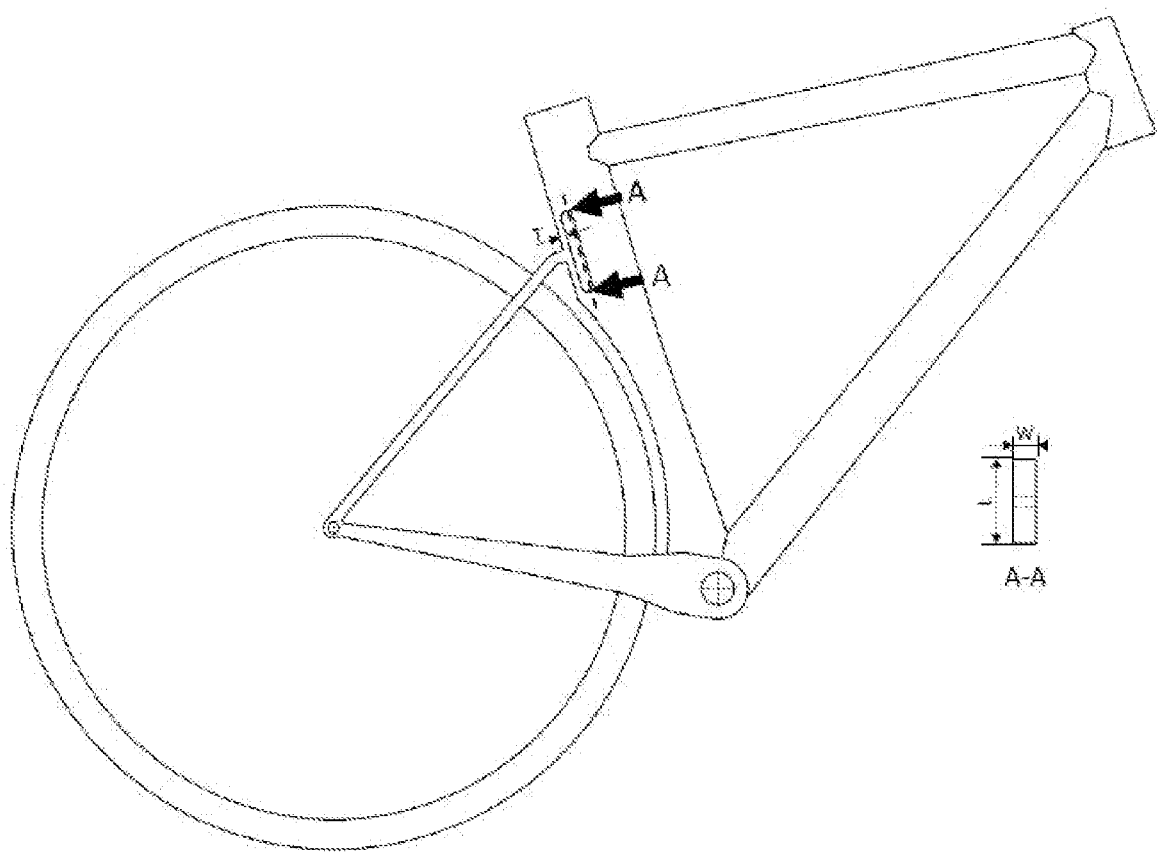

FIG. 2 shows an embodiment of said low travel rear wheel suspension system, where said seat tube posterior part is shaped to act as a leaf spring, i.e. is shaped substantially thinner T than it is wide W or long L.

Figure 3:
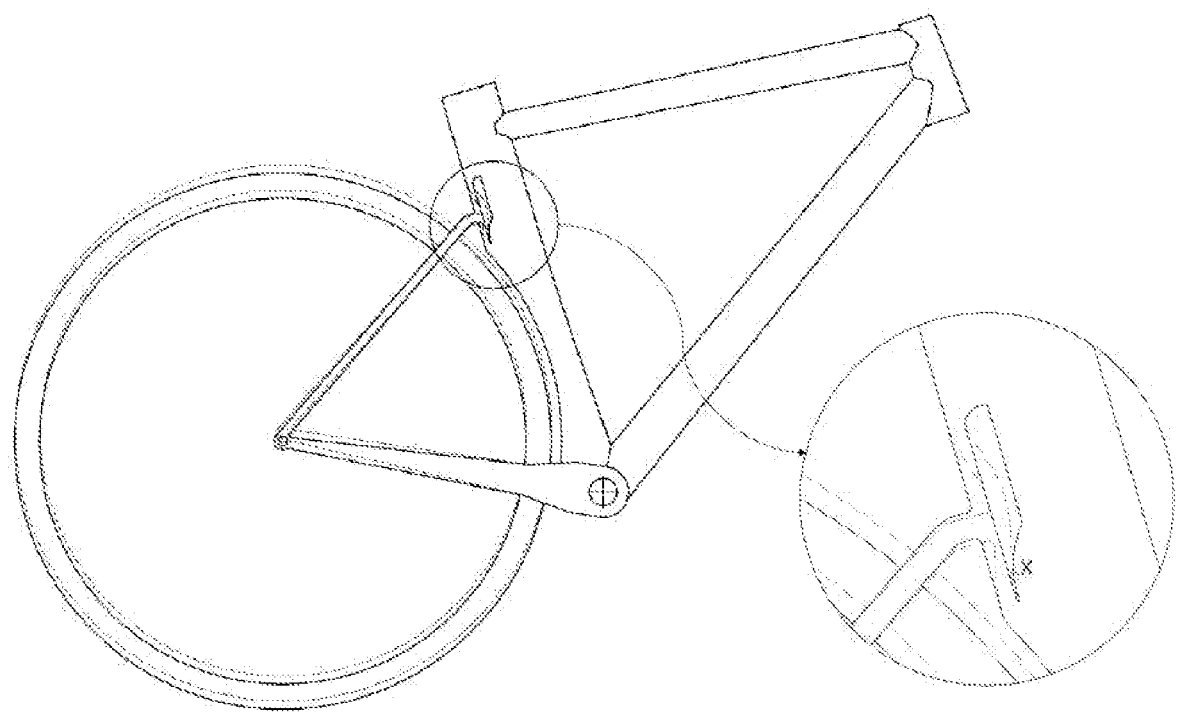

FIG. 3 shows an embodiment of said low travel rear wheel suspension system, where said seat tube posterior part and said seat tube anterior part are formed so that the effective spring length of said seat tube posterior part is shortened as the said low travel rear wheel suspension system compresses, by said seat tube posterior part coming into contact with said seat tube, notably the seat tube anterior part, at point X.

Thus, making for a progressive spring rate suspension system, this being a benefit for riders who want extra sensitive suspension for smaller hits, while having stiffer suspension deeper into the suspension travel.

Figure 4A:
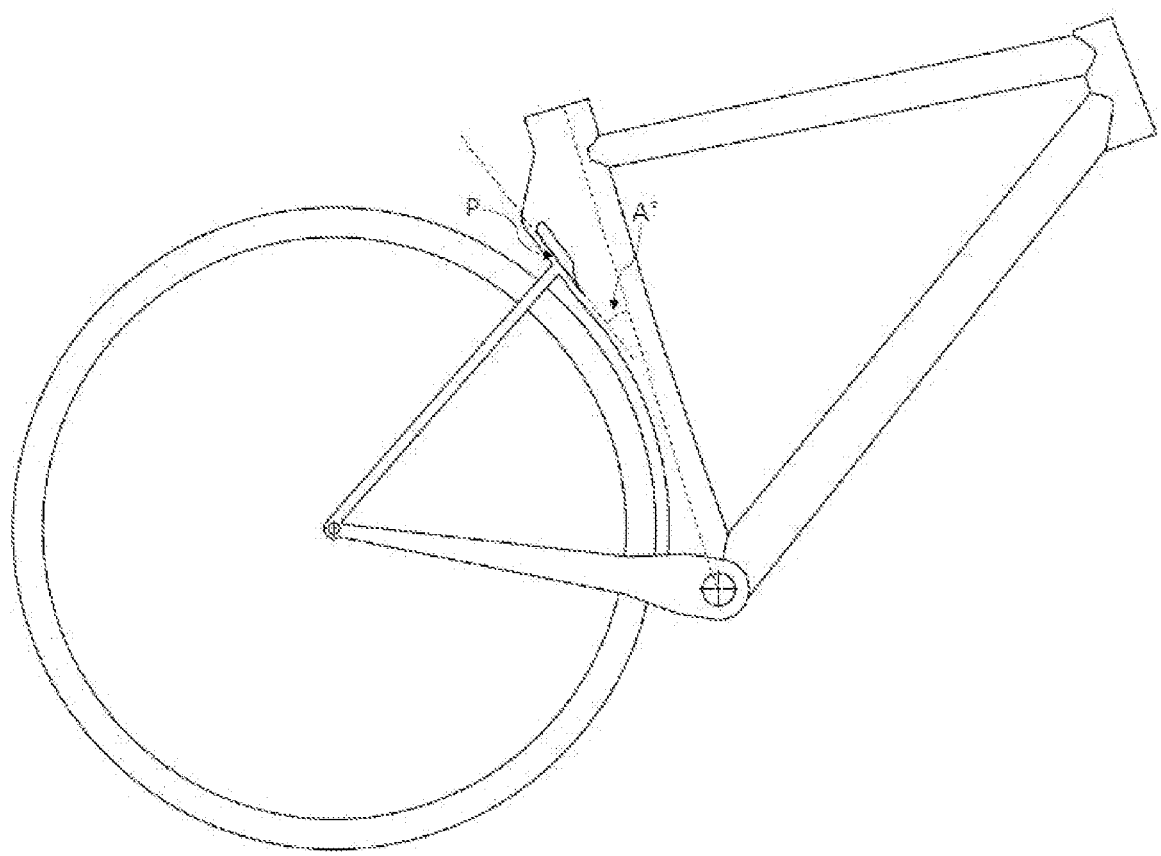
Figure 4B:
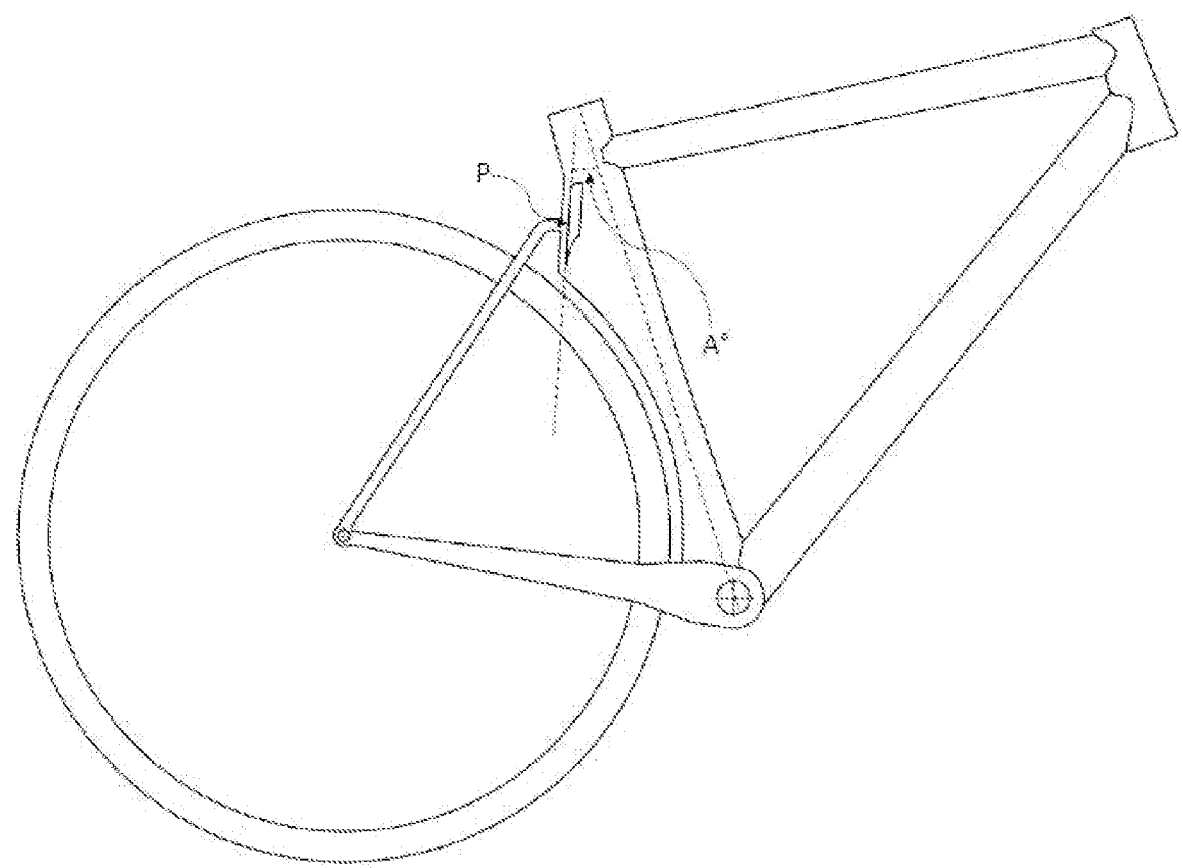

FIGS. 4*a* and 4*b* show an embodiment of said low travel rear wheel suspension system, where at least half of the length of said seat tube posterior part is at any given location less than 20° from being parallel to the seat tube of said bike comprising said low travel rear wheel suspension system, angle at point P from said seat tube posterior part towards said seat tube angle shown as A° in FIG. 4*a* and FIG. 4*b*.

Thus, enabling said seat tube posterior part to conform well to the natural shape and orientation of said seat tube, conserving fairly traditional aesthetics while also providing flex that effectively results in vertical flex of said chainstays, thus providing vertical suspension of said rotably attached rear wheel.

In one embodiment of said low travel rear wheel suspension system, said seat tube cavity has height of between 5 cm and 25 cm, such as between 10 cm and 25 cm.

Thus, providing sufficient length of said seat tube posterior part to provide desired suspension function while still fitting into the available space in conventional seat tubes on modern road bike frames.

Figure 5:
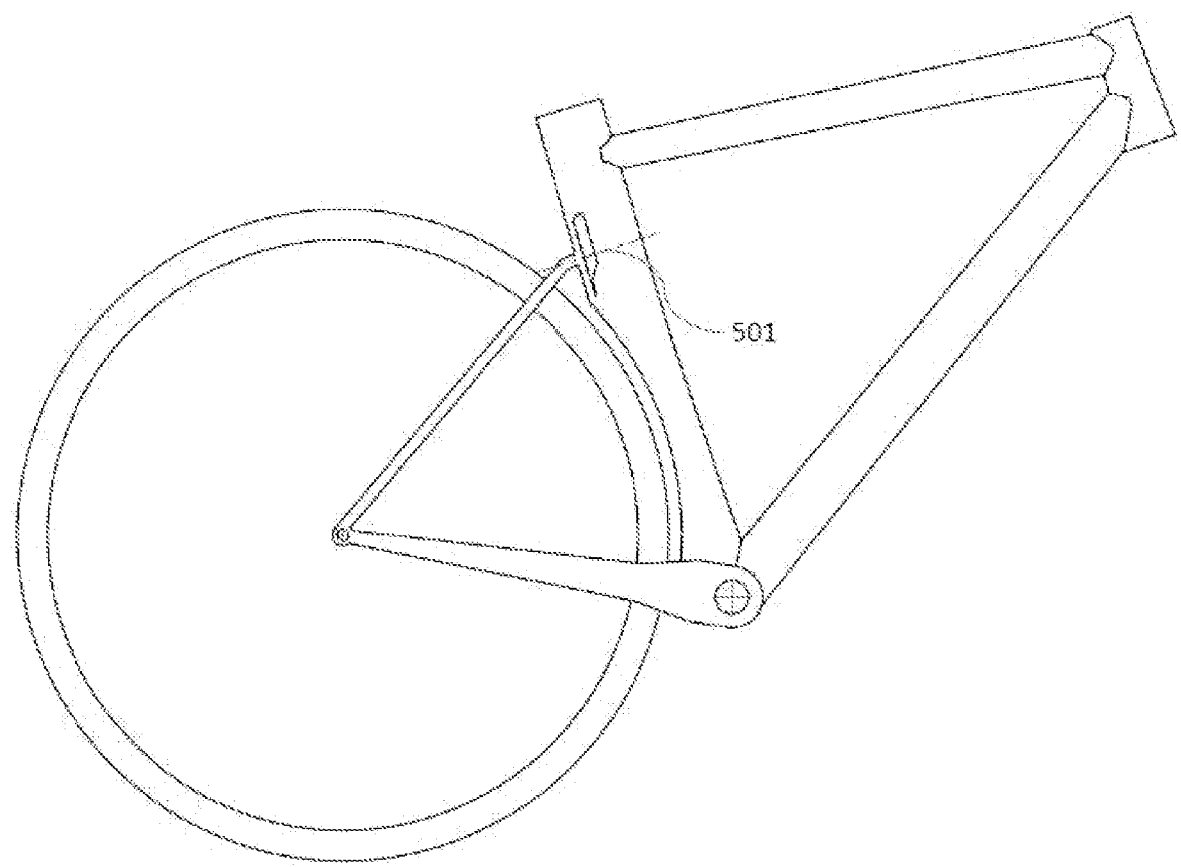

FIG. 5 shows an embodiment of said low travel rear wheel suspension system, where said seatstays connect to said seat tube posterior part substantially in the height center 501 area of said seat tube posterior part.

Thus, optimizing the combined spring contribution, i.e. maximizing flexibility while being able to carry a certain weight at a certain suspension displacement, of the 2 effective leaf springs of said seat tube posterior part that are; 1. Below the connection to said seatstays and 2. Above the connection to said seatstays.

Figure 6:
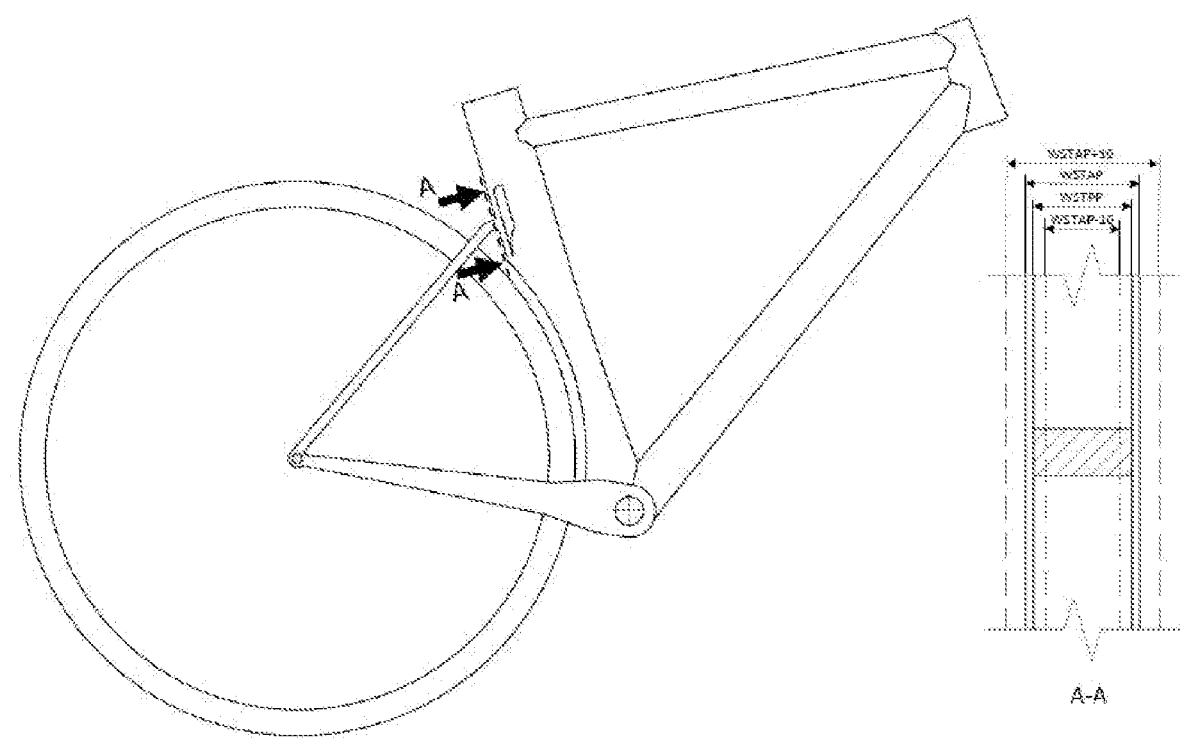

FIG. 6 shows an embodiment of said low travel rear wheel suspension system, where the width of said seat tube posterior part WSTPP at any given height above ground location is, when looked at from behind, within 10 mm of the width of said seat tube anterior part WSTAP in the same height above ground location.

Thus, achieving good flexural performance, i.e. being able to carry high weight over a large displacement at a good stiffness in the intended flex direction, and good lateral stiffness of said seat tube posterior part with limited obtrusiveness and limited added air resistance.

Figure 7:
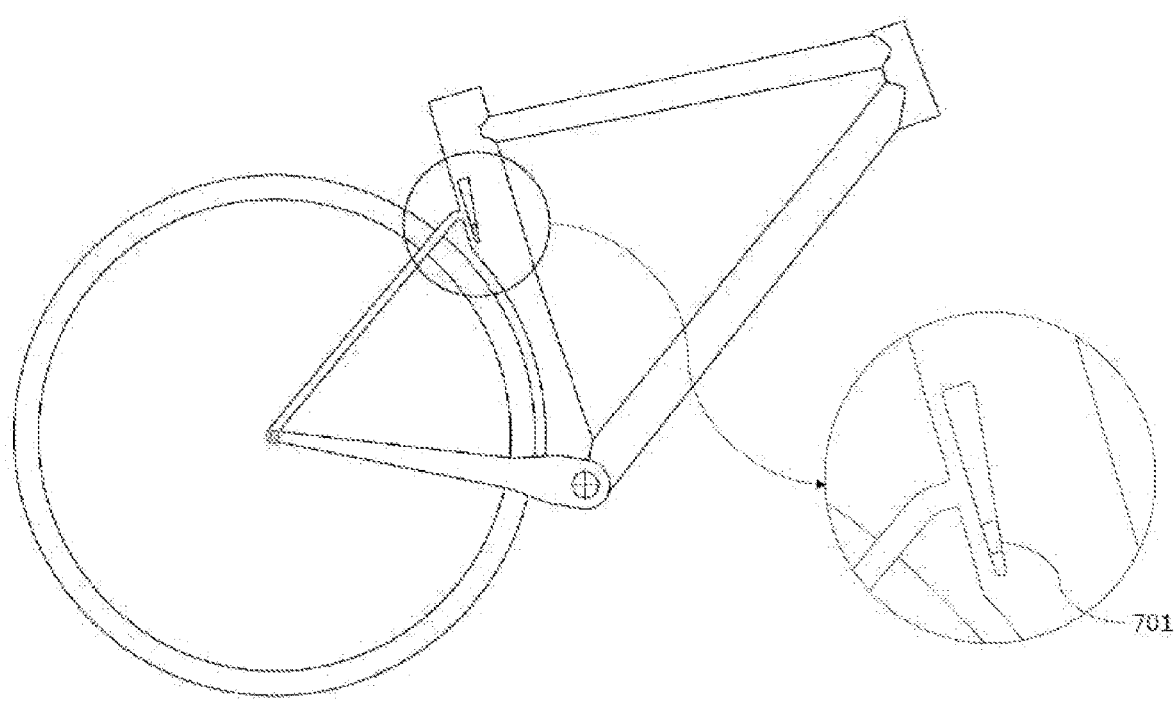
FIGS. 7-20 show embodiments of adjustable versions of the present invention.

FIG. 7 shows an embodiment of said low travel rear wheel suspension system, where said low travel rear wheel suspension system further comprises one or more stiffness adjustment inserts 701, arranged and secured in place between said seat tube posterior part and said seat tube anterior part, said one or more stiffness adjustment inserts being secured in place by any applicable fastening methods.

Thus, enabling riders of different body weight and/or with different riding preferences to shorten the effective spring length of said seat tube posterior part and thus increasing the spring rate of said low travel rear wheel suspension system.

In one embodiment of said low travel rear wheel suspension system, one or more of said one or more stiffness adjustment inserts are each contacting both said seat tube posterior part and said seat tube anterior part when rider is stationary in riding position on said bike.

Thus, changing the initial stiffness of the said low travel rear wheel suspension system.

Figure 8:
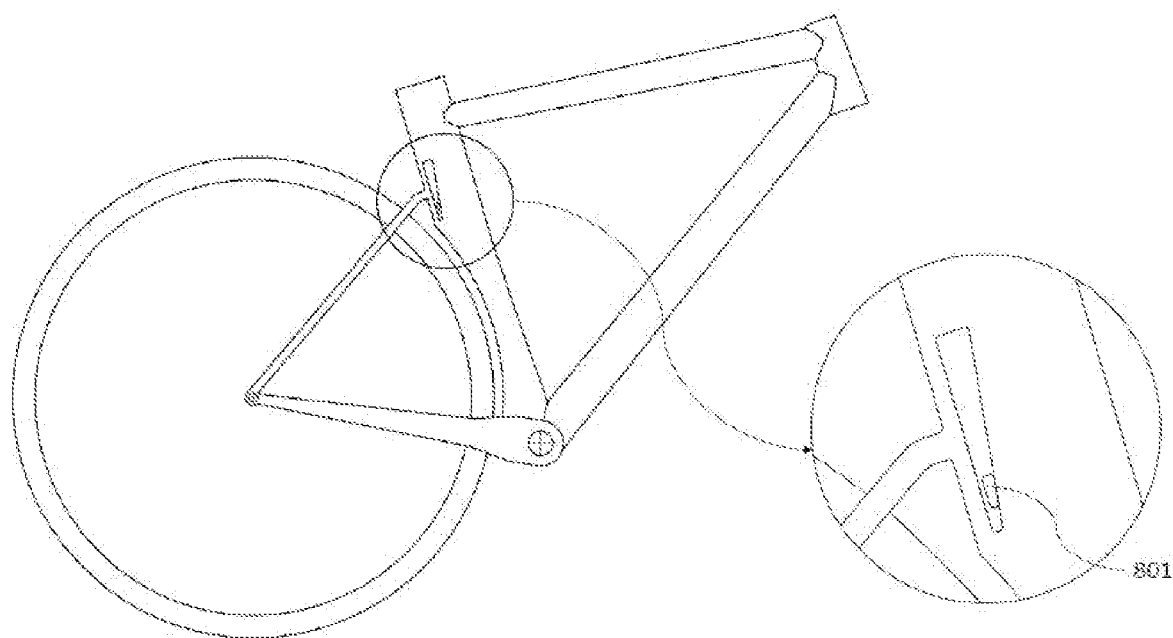

FIG. 8 shows an embodiment of said low travel rear wheel suspension system, where one or more of said one or more stiffness adjustment inserts 801 are each contacting only either said seat tube posterior part or said seat tube anterior part when rider is stationary in riding position on said bike, then each contacting both said seat tube posterior part and said seat tube anterior part when said low travel rear wheel suspension system is further compressed into its suspension travel.

Thus, when only partially reaching between said seat tube posterior part and said seat tube anterior part said one or more stiffness adjustment inserts can make for a progressive spring rate suspension system, as the said one or more inserts can come into contact with both sides when the suspension system has partially compressed and thereby decreasing the effective spring length, this is a benefit for riders who want extra sensitive suspension for smaller hits, while having stiffer suspension deeper into the suspension travel.

In one embodiment of said low travel rear wheel suspension system, one or more of said one or more stiffness adjustment inserts are elevatable substantially perpendicularly to said seat tube posterior part, either secured to said seat tube posterior part and adjustable in how far they are elevated towards said seat tube anterior part, or secured to said seat tube anterior part and adjustable in how far they are elevated towards said seat tube posterior part, said one or more stiffness adjustment inserts being secured in place by any applicable fastening method.

Thus, when fully reaching the opposite side, with a rider stationary in riding position on said bike, shortening the effective spring length of said seat tube posterior part and thus stiffening the suspension, making it suit riders preferring stiffer suspension, when partially reaching the opposite side the said elevatable stiffness adjustment insert can make for a progressive spring rate suspension system, as the said elevatable stiffness adjustment insert comes into contact with the opposite side when the suspension system has partially compressed, this is a benefit for riders who want extra sensitive suspension for smaller hits, while having stiffer suspension deeper into the suspension travel.

Figure 9:
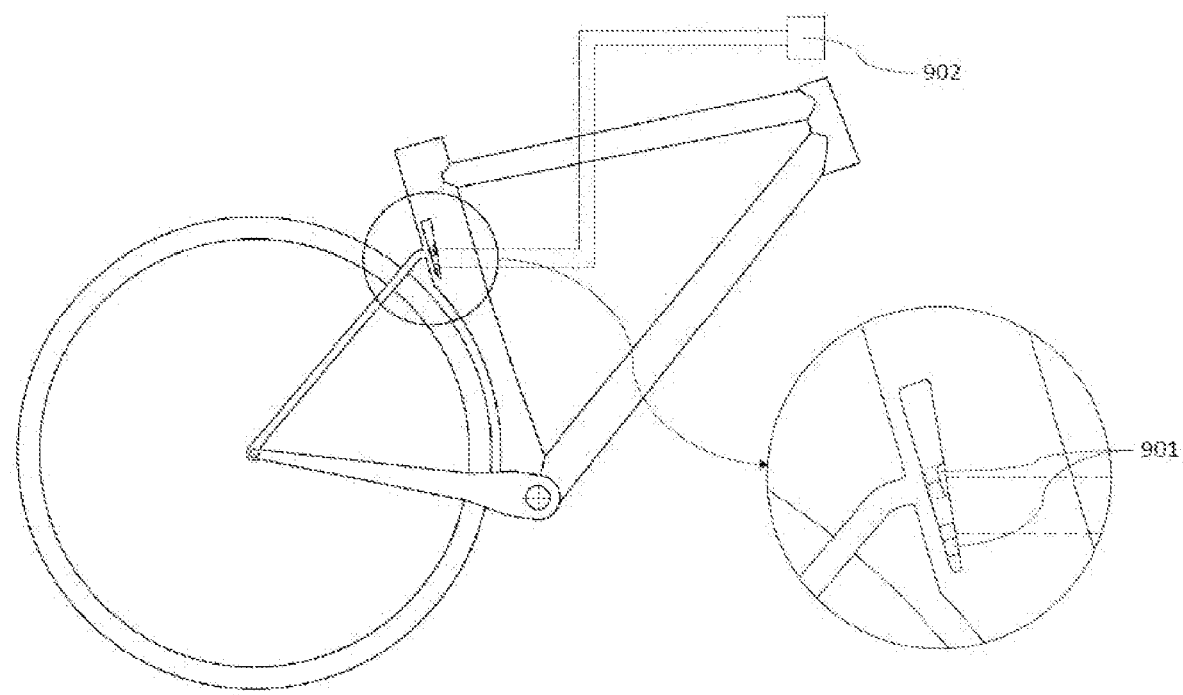

FIG. 9 shows an embodiment of said low travel rear wheel suspension system comprising said one or more elevatable stiffness adjustment inserts 901, where one or more of said one or more elevatable stiffness adjustment inserts can be elevated by actuators such as, but not limited to, hydraulic pistons, screw jacks, etc. Said actuators can, e.g. but not limited to, be manually operated via buttons, levers, turn knobs, dials or with a tool such as an allen key or screwdriver. Operation of said actuators can be via a cable- or hydraulically connected remote, furthermore, said actuators can e.g. be driven by electric motors, either controlled via an electrical wire connected remote or via a wireless remote. Said cable-, hydraulic-, electrical wire- or electrical wireless-remotes 902 can for instance be mounted on the handlebar of said bike.

Figure 10:
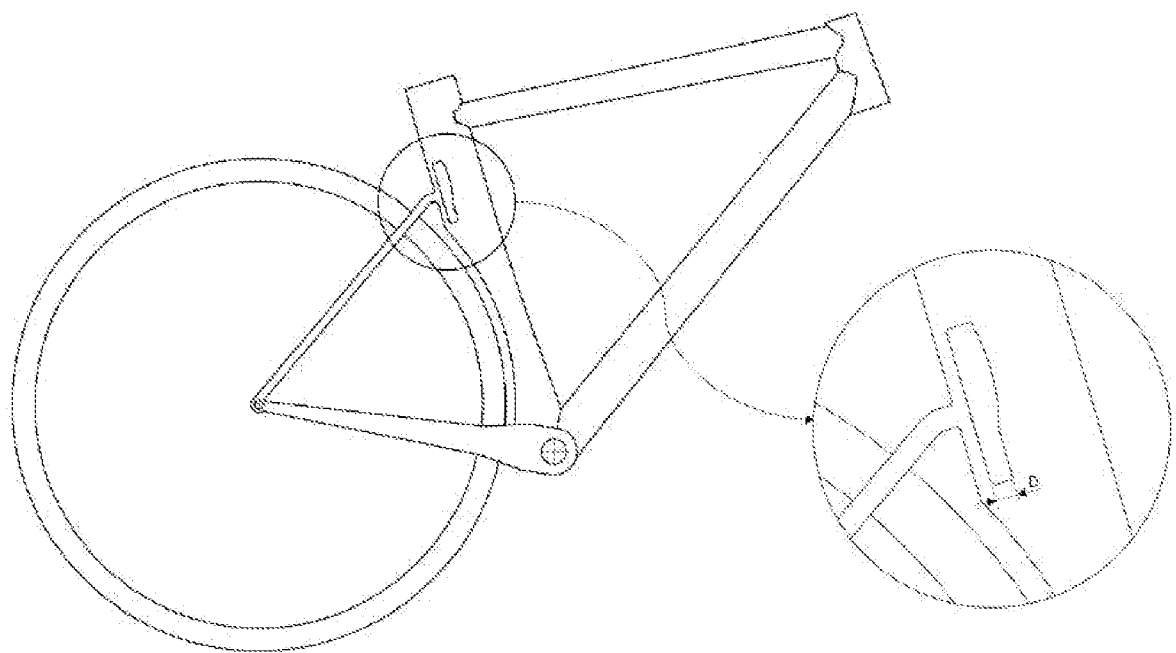

FIG. 10 shows an embodiment of said low travel rear wheel suspension system, where said seat tube posterior part is substantially parallel to the adjacent surface of said seat tube anterior part on; the lengthwise portion of said seat tube posterior part that reaches from where said seat tube posterior part connects to remainder of said seat tube at the lower end of said seat tube cavity and from there upwards along the length of said seat tube anterior part at least 50% of the way to where it connects to said seatstays, in this said substantially parallel lengthwise portion the substantially perpendicular distance D between said seat tube posterior part and said seat tube anterior part being between 1 mm and 30 mm, such as 5-30 mm.

Thus, creating "real estate" for slidable stiffness adjustment inserts between said seat tube posterior part and said seat tube anterior part. Said slidable stiffness adjustment inserts able to slide upwards and downwards along said seat tube posterior part and said seat tube anterior part to tune the stiffness of said low travel rear wheel suspension system.

Figure 11:
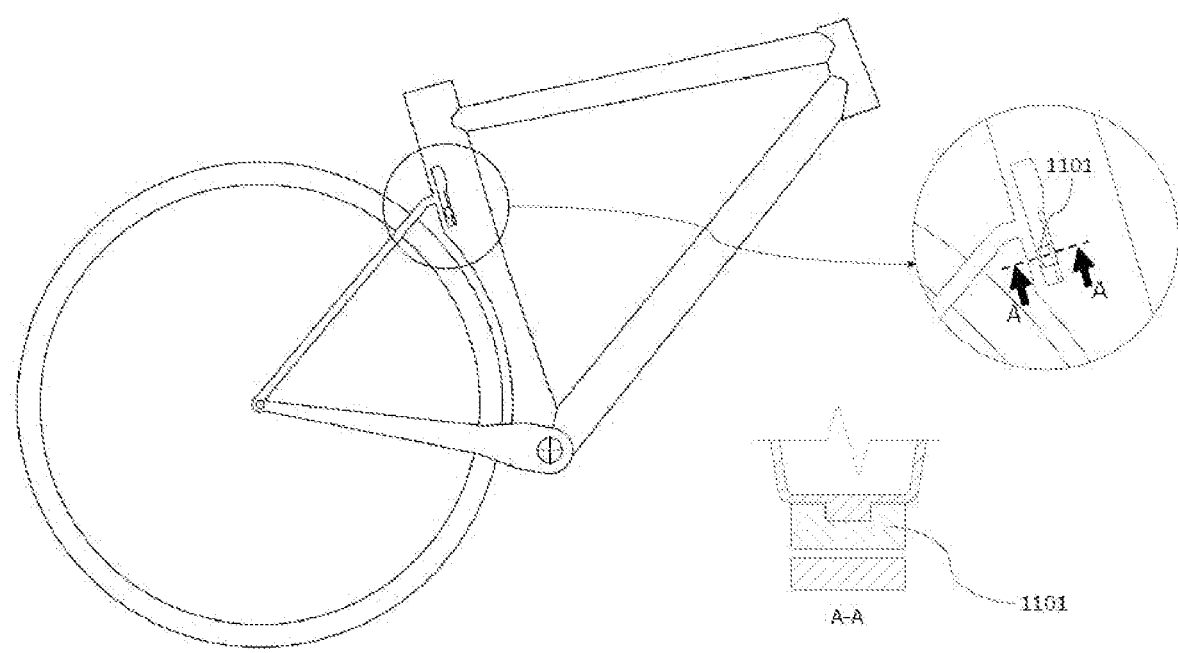

FIG. 11 shows an embodiment of said low travel rear wheel suspension system, where one or more of said one or more stiffness adjustment inserts are slidable upwards and downwards along and between said seat tube posterior part and said seat tube anterior part, said one or more slidable stiffness adjustment inserts 1101 being guided to prevent lateral movement, when rider is stationary in riding position on said bike said one or more slidable stiffness adjustment inserts can either reach entirely between said seat tube posterior part and said seat tube anterior part, or as shown in this figure, reach partially between said seat tube posterior part and said seat tube anterior part.

Thus, when reaching entirely between said seat tube posterior part and said seat tube anterior part shortening the effective spring length of said seat tube posterior part and thus stiffening the suspension, when partially reaching between the said seat tube posterior part and said seat tube anterior part the said one or more slidable stiffness adjustment inserts can make for a progressive spring rate suspension system, as the said insert achieves contacts with both said seat tube posterior part and said seat tube anterior part when the suspension system has partially compressed, this is a benefit for riders who want extra sensitive suspension for smaller hits, while having stiffer suspension deeper into the suspension travel. Being slidable upwards/downwards can enable a rider to conveniently adjust his suspension according to his preference.

In one embodiment of said low travel rear wheel suspension system, comprising one or more slidable stiffness adjustment inserts, one or more of said one or more slidable stiffness adjustment inserts comprise a mechanically gripping texture A that interacts with a matching opposing mechanically gripping texture B on said seat tube posterior part and/or said seat tube anterior part, said one or more mechanically gripping slidable stiffness adjustment inserts further comprising means of pressuring said opposing mechanically gripping textures A and B together, said pressuring may be done via, but not limited to, spring loading, screw tightening, etc.

Thus, preventing said one or more mechanically gripping slidable stiffness adjustment inserts from slipping unintentionally upwards or downwards along said seat tube posterior part and said seat tube anterior part during riding of said bike.

Figure 12A:
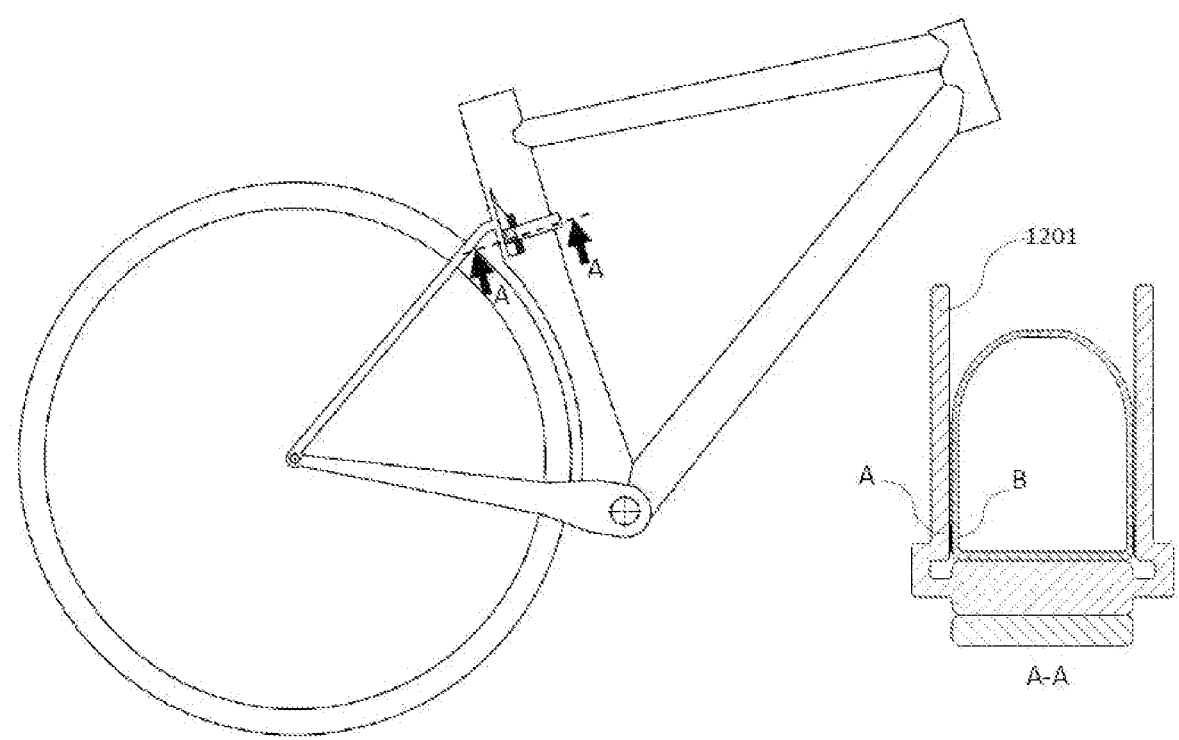
Figure 12B:
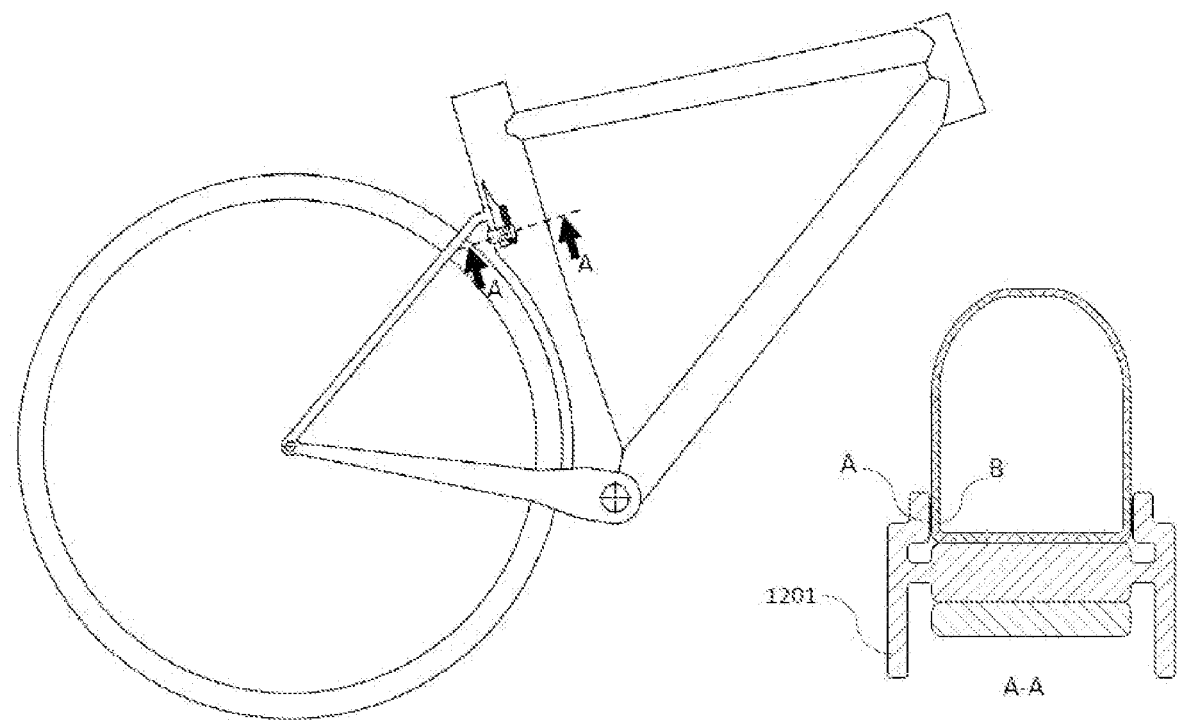

FIGS. 12a and 12b show embodiments of said low travel rear wheel suspension system, where said pressuring of said opposing mechanically gripping textures A and B together is achieved through a spring-loaded lever 1201, where pushing or pulling the lever releases said pressure and thus allows said slidable stiffness adjustment insert to be slid upwards or downwards while lever is pushed or pulled. FIG. 12a shows a pull lever, while FIG. 12b shows a push lever.

In one embodiment of said low travel rear wheel suspension system, comprising one or more slidable stiffness adjustment inserts, one or more of said one or more slidable stiffness adjustment inserts comprise a wheel or pinion that interacts with cogged or toothed bars or rails that are fixed to said seat tube posterior part and/or said seat tube anterior part and extend upwards/downwards along said seat tube posterior part and/or said seat tube anterior part.

Thus, by turning said wheel or pinion driving said one or more slidable stiffness adjustment inserts upwards/downwards, said wheel or pinion moving upwards/downwards with said slidable stiffness adjustment insert, and thus altering the stiffness of said low travel rear wheel suspension system by shortening/lengthening the effective spring length of said seat tube posterior part.

Figure 13:
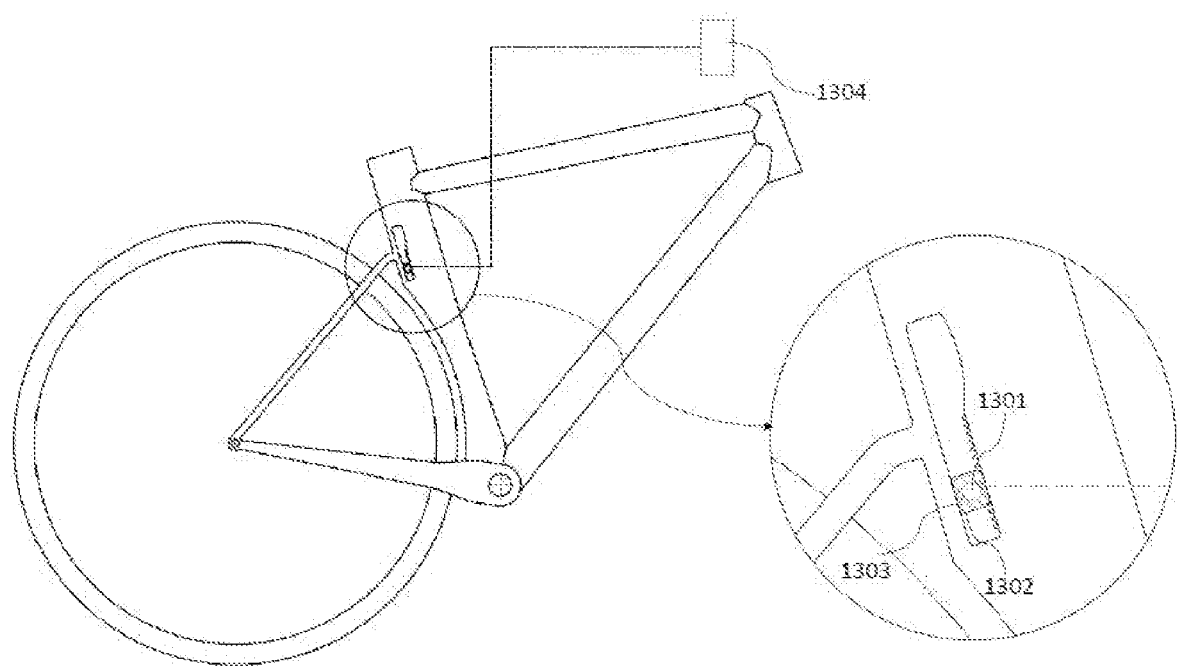

FIG. 13 shows an embodiment of said low travel rear wheel suspension system, comprising said wheel or pinion 1301 on one or more of said one or more slidable stiffness adjustment inserts 1302, where said wheel or pinion is connected to a drive mechanism 1303 operated via, but not limited to, a button, a lever, a turn knob, a dial or via a tool such as an allen key or screwdriver, operation can e.g. be via a cable- or hydraulically connected remote, or in the case when said drive mechanism is powered by one or more electric motors, either via electrical-wire connected remote or via wireless remote, said remotes 1304, weather they are connected by a cable-, hydraulic line, electrical wire- or electrical wireless communications, can for instance be mounted on the handlebar of said bike.

In one embodiment of said low travel rear wheel suspension system, comprising one or more slidable stiffness adjustment inserts, one or more of said one or more slidable stiffness adjustment inserts comprise one or more cogged or toothed bars or rails that extend upwards or downwards from said one or more of said one or more slidable stiffness adjustment inserts substantially along said seat tube posterior part and/or said seat tube anterior part, said seat tube posterior part and/or said seat tube anterior part comprising a wheel or pinion that interacts with said one or more cogged or toothed bars or rails.

Thus, by turning said wheel or pinion driving said one or more slidable stiffness adjustment inserts up/down, while said wheel or pinion does not move upwards/downwards itself relatively to said seat tube posterior part and/or said seat tube anterior part, and thus altering the stiffness of said low travel rear wheel suspension system by shortening/lengthening the effective spring length of said seat tube posterior part.

In one embodiment of said low travel rear wheel suspension system, comprising one or more slidable stiffness adjustment inserts, one or more of said one or more slidable stiffness adjustment inserts comprise one or more cogged or toothed bars or rails that extend downwards or upwards from said one or more of said one or more slidable stiffness adjustment inserts substantially along said seat tube posterior part and/or said seat tube anterior part and then extending further through an opening at top or bottom of said seat tube cavity, into a second cavity in said seat tube, said seat tube posterior part and/or said seat tube anterior part comprising a wheel or pinion that interacts with said one or more cogged or toothed bars or rails.

Thus, said opening at the top or bottom of said seat tube cavity facilitates said cogged or toothed bars to move into said opening thus allowing associated said one or more slidable stiffness adjustment insert to be slid closer to the respective top or bottom of said cavity.

In one embodiment of said low travel rear wheel suspension system, comprising one or more slidable stiffness adjustment inserts, one or more of said one or more slidable stiffness adjustment inserts comprise one or more cogged or toothed bars or rails that extend downwards or upwards from said one or more of said one or more slidable stiffness adjustment inserts substantially along said seat tube posterior part and/or said seat tube anterior part and then extending further through an opening at top or bottom of said seat tube cavity, into a second cavity in said seat tube, said second cavity in said seat tube comprising a wheel or pinion that interacts with said one or more cogged or toothed bars or rails, said second cavity in said seat tube also comprising an associated drive mechanism of said wheel or pinion.

Thus, by housing said wheel or pinion and associated drive mechanism in said second cavity, aforementioned components can be neatly nested in said second cavity, offering good protection from the elements and hits, good fastening options to said cavity of said seat tube, and last but not least, neatly keeping said components away from the valuable space used for flex of said posterior seat tube part.

Figure 14A:
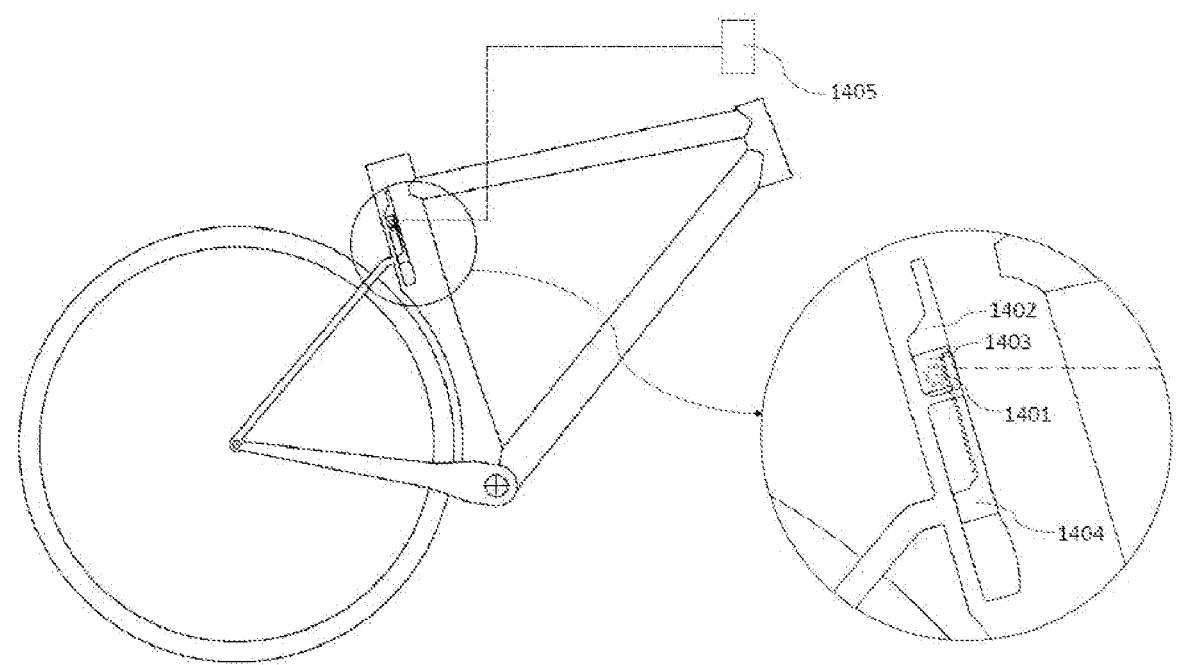
Figure 14B:
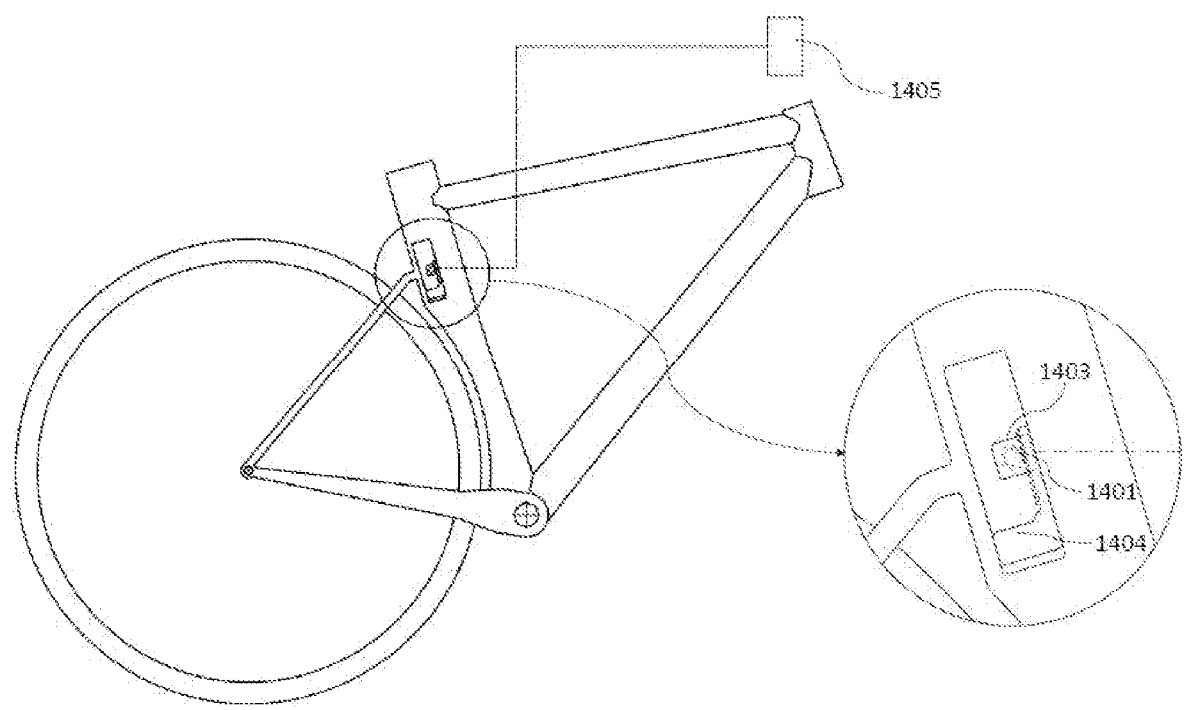

FIGS. 14a and 14b show embodiments of said low travel rear wheel suspension system, where said wheel or pinion 1401 located on; said seat tube posterior part, said seat tube anterior part or in said second cavity 1402 in said seat tube, is connected to a drive mechanism 1403 (driving said one or more of said one or more slidable stiffness adjustment inserts 1404) operated via, but not limited to, buttons, levers, turn knobs, dials or with a tool such as an allen key or screwdriver, operation can e.g. be via a cable- or hydraulically connected remote, or in the case when said drive mechanism is driven by one or more electric motors, either via electrical-wire connected remote or via wireless remote 1405. Said remotes, weather they are connected by a cable-, hydraulic line, electrical wire- or electrical wireless communications, can for instance be mounted on the handlebar of said bike.

In one embodiment of said low travel rear wheel suspension system comprising one or more slidable stiffness adjustment inserts, one or more of said one or more slidable stiffness adjustment inserts can be slid upwards/downwards by a screw jack actuator.

In one embodiment of said low travel rear wheel suspension system comprising one or more slidable stiffness adjustment inserts, one or more of said one or more slidable stiffness adjustment inserts can be slid upwards/downwards by a linear hydraulic actuator.

In one embodiment of said low travel rear wheel suspension system, said linear hydraulic actuators or said screw jack actuators can, e.g. but not limited to, be manually operated via buttons, levers, turn knobs, dials or with a tool such as an allen key or screwdriver. Operation of said actuators can be via a cable- or hydraulically connected remote. Furthermore, said actuators can e.g. be driven by electric motors, either controlled via an electrical wire connected remote or via a wireless remote. Said cable-, hydraulic-, electrical wire- or electrical wireless-remotes can for instance be mounted on the handlebar of said bike.

Figure 15:
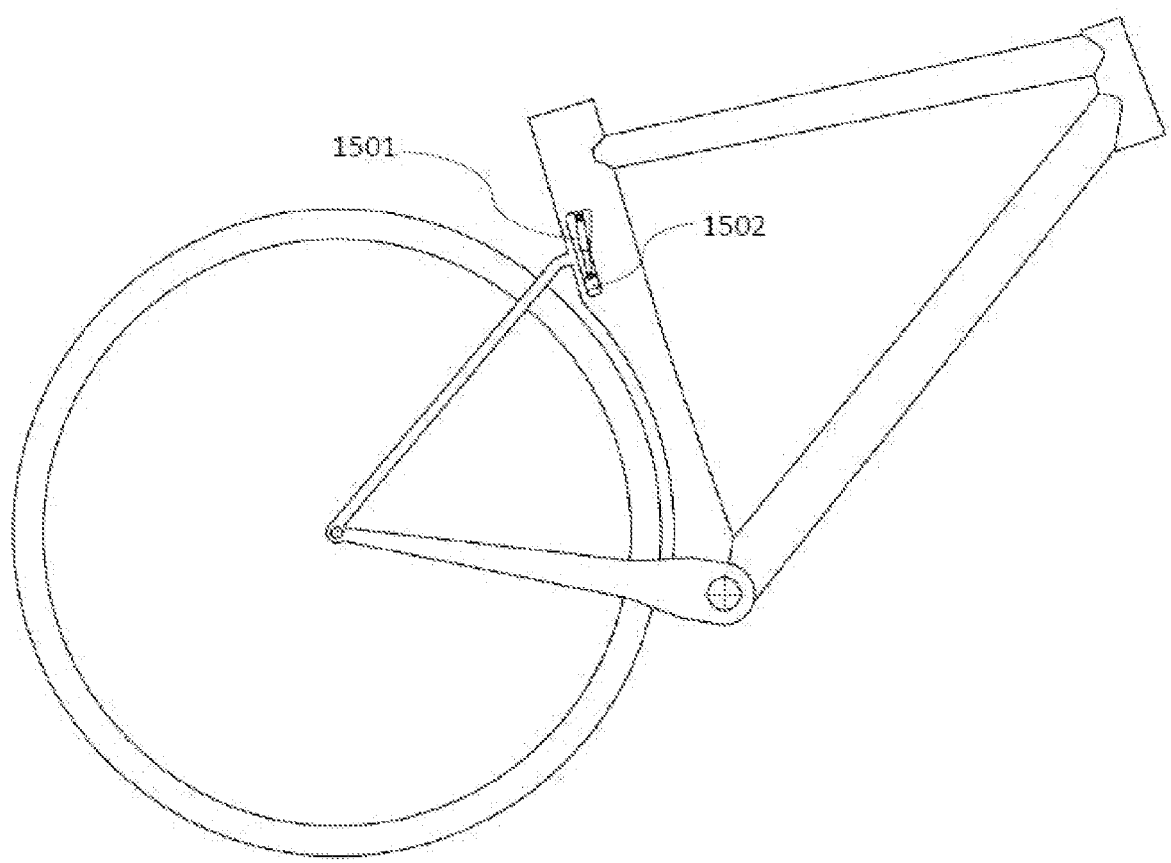

FIG. 15 shows an embodiment of said low travel rear wheel suspension system comprising said linear hydraulic actuator 1501, where said linear hydraulic actuator extends upwards from said one or more of said one or more slidable stiffness adjustment inserts 1502 and then connects its other end to said seat tube anterior part.

Figure 16:
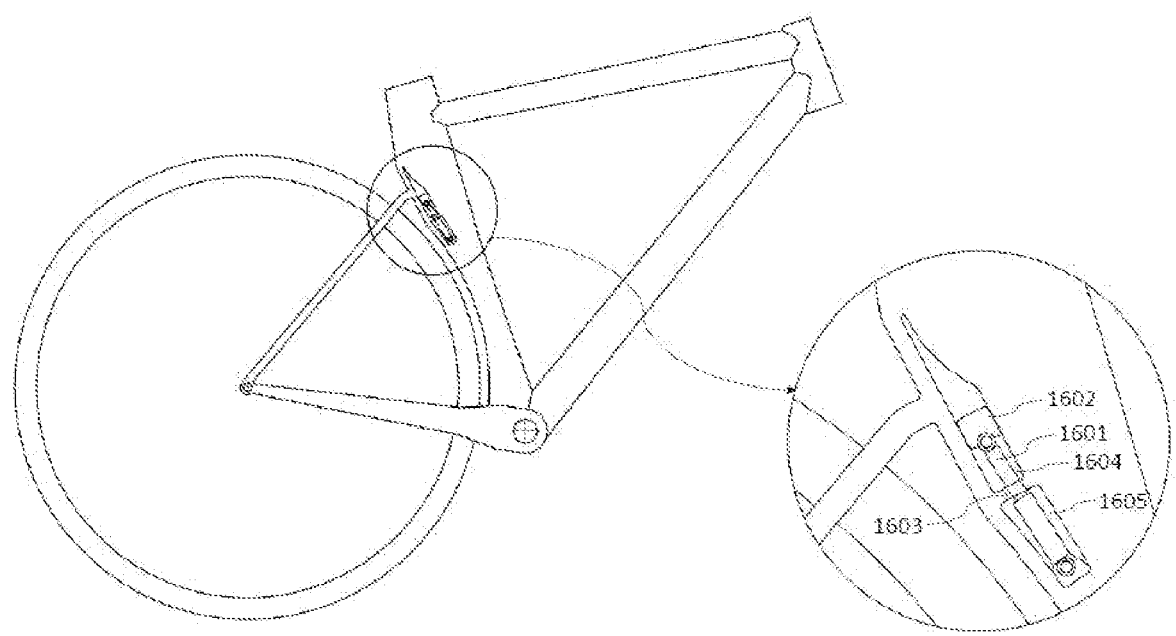

FIG. 16 shows an embodiment of said low travel rear wheel suspension system comprising said linear hydraulic actuator 1601, where said linear hydraulic actuator extends downwards from said one or more of said one or more slidable stiffness adjustment inserts 1602 and then extending further through an opening 1603 at the bottom of said seat tube cavity 1604, into a second cavity 1605 in said seat tube.

Thus, said opening at the top or bottom of said seat tube cavity facilitates said linear hydraulic actuator to extend into said opening thus allowing associated said one or more slidable stiffness adjustment insert to be slid closer to the respective top or bottom of said cavity.

Figure 17:
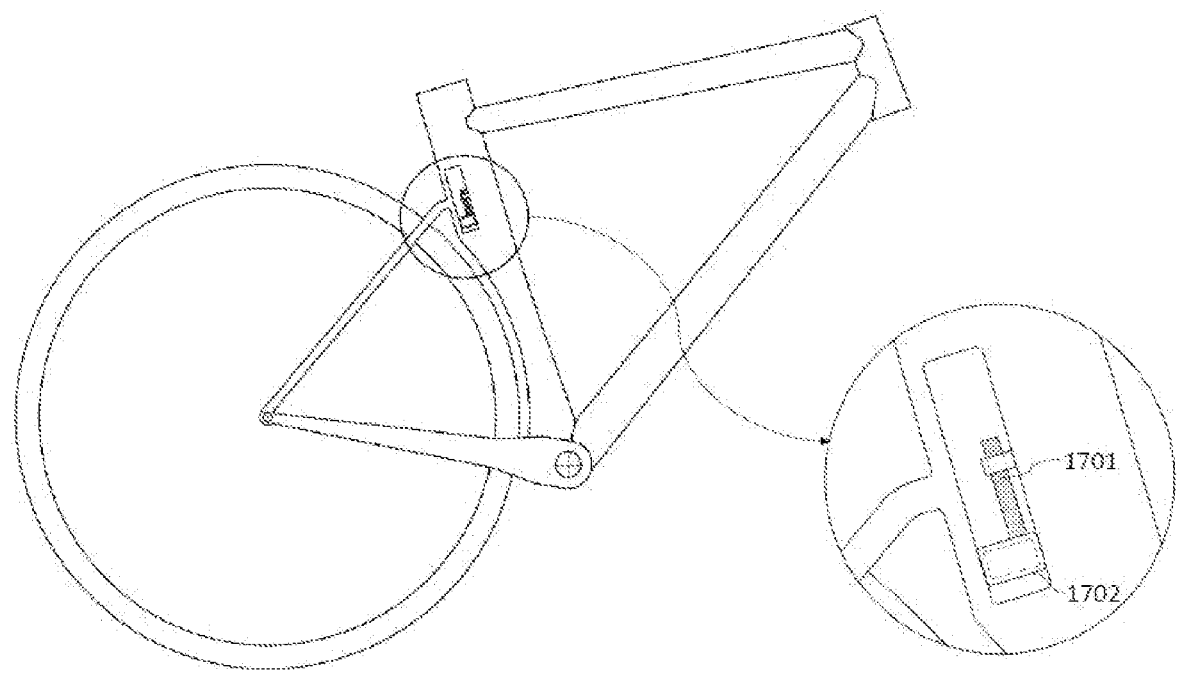

FIG. 17 shows an embodiment of said low travel rear wheel suspension system comprising said screw jack actuator 1701, where said screw jack actuator extends upwards from said one or more of said one or more slidable stiffness adjustment inserts 1702 and then connects its other end to said seat tube anterior part.

Figure 18A:
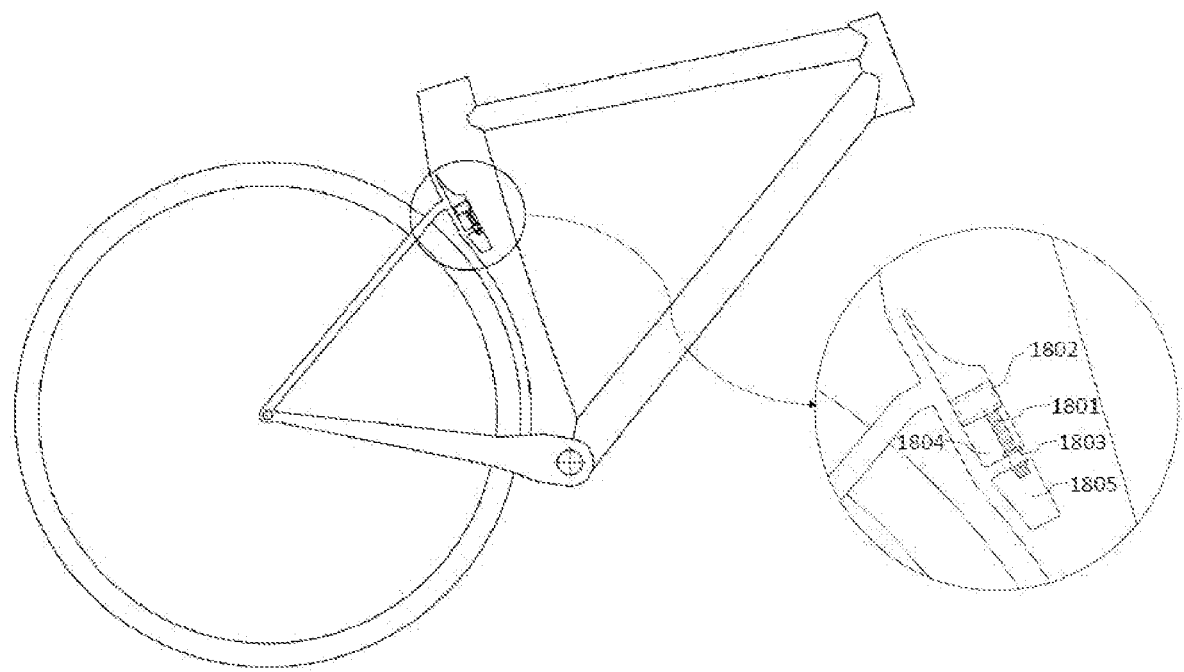
Figure 18B:
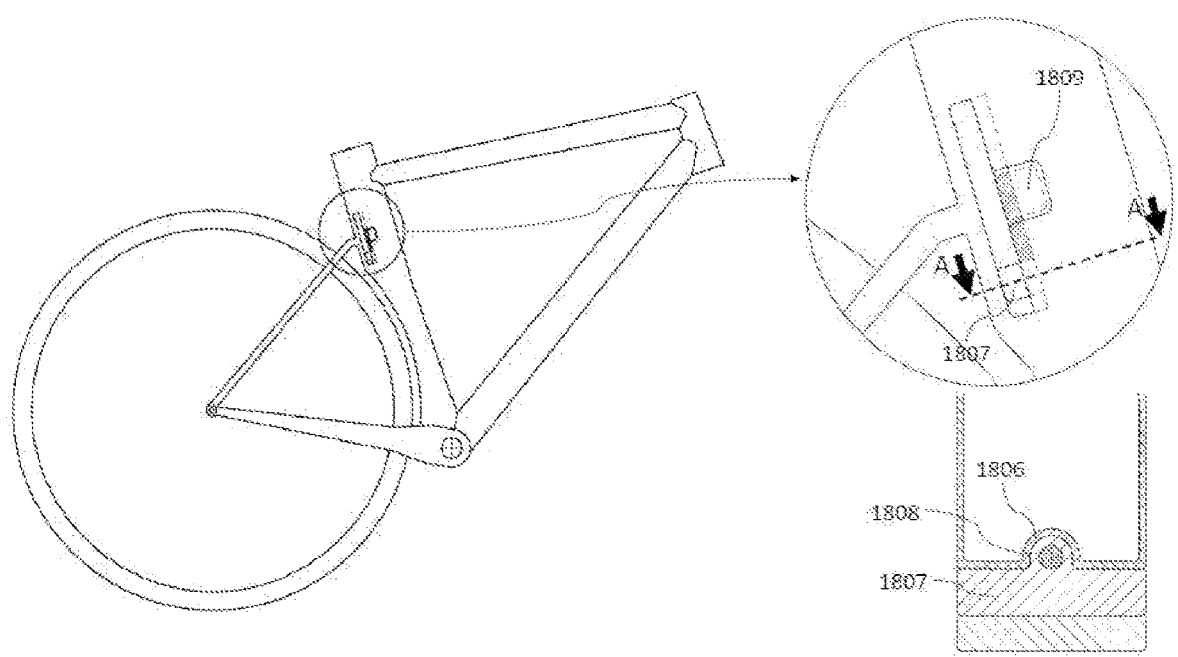

FIG. 18a shows an embodiment of said low travel rear wheel suspension system comprising said screw jack actuator 1801, where said screw jack actuator extends downwards from said one or more of said one or more slidable stiffness adjustment inserts 1802 and then extending further through an opening 1803 at top or bottom of said seat tube cavity 1804, into a second cavity 1805 in said seat tube. While FIG. 18b shows an embodiment of said low travel rear wheel suspension system comprising said screw jack linear actuator arranged in a groove 1806 that runs up and down the posterior surface of said anterior part of said seat tube and said one or more of said one or more slidable stiffness adjustment inserts 1807 have an extrusion 1808 shaped to interact laterally with the surface of said groove. In this embodiment a driving mechanism 1809 is located centrally in said seat tube cavity, while it could just as well be located at the other end of the said screw jack linear actuator below said seat tube cavity.

In one embodiment of said low travel rear wheel suspension system, said seat tube cavity and/or said second cavity in said seat tube are protected by removable or non-removable covers on its left and/or right sides.

In one embodiment of said low travel rear wheel suspension system, said second cavity in said seat tube is made up by two tube shapes extending upwards/downwards, one of the tube shapes being posterior to said second cavity in said seat tube and the other tube shape being anterior to said second cavity in said seat tube, the two tube shapes connecting together above and below said second cavity in said seat tube.

Figure 19:
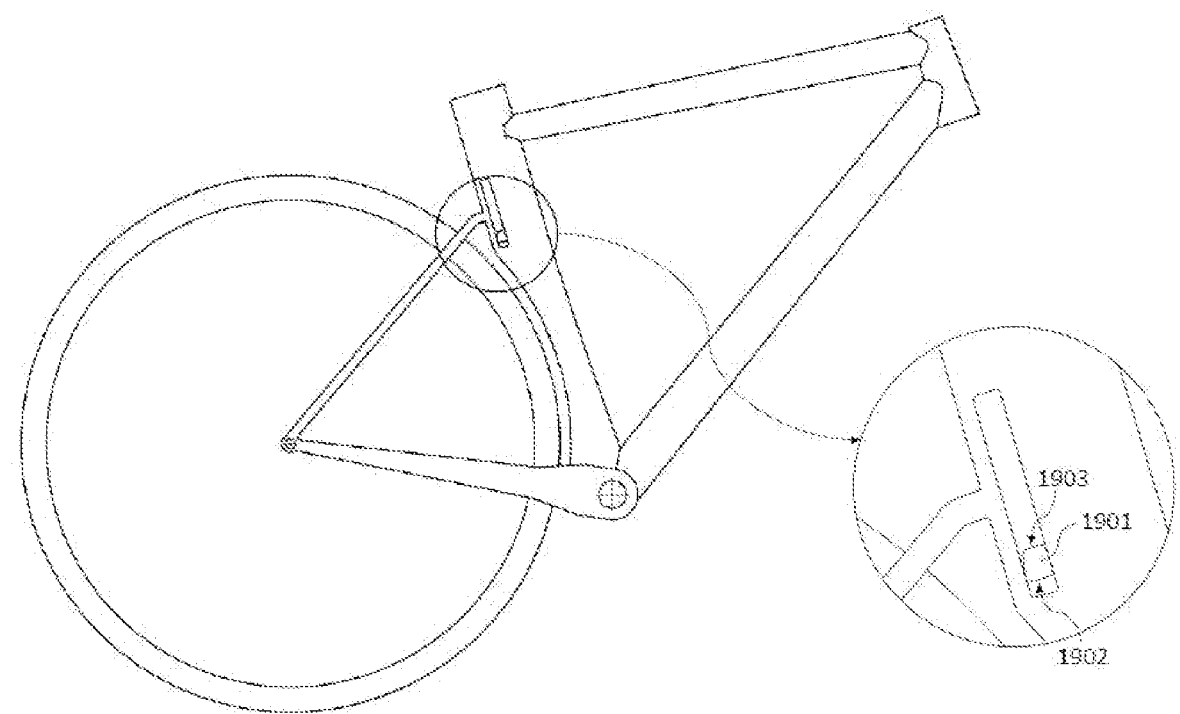

FIG. 19 shows an embodiment of said low travel rear wheel suspension system, comprising one or more stiffness adjustment inserts 1901, where one or more of said one or more stiffness adjustment inserts 1901 are formed so that the thickness 1902 of said one or more of said one or more stiffness adjustment inserts at the end that further from connection of said seat stays and said seat tube posterior part is such that, when rider is stationary in riding position on said bike, it reaches entirely between said seat tube posterior part and said seat tube anterior part, while its thickness 1903 at the end closer to the connection of said seat stays and said seat tube posterior part is such that it lacks up to 5 mm to reach entirely between said seat tube posterior part and said seat tube anterior part.

This can make each of said one or more of said one or more stiffness adjustment inserts provide more than one spring rate for said low travel rear wheel suspension system, i.e. providing progressive stiffness. Stiffness ramping up as the end further away from the intersection of said seat stays and said seat tube posterior part comes in contact with both said seat tube posterior part and said seat tube anterior part, as the said suspension system has been partially compressed.

Figure 20:
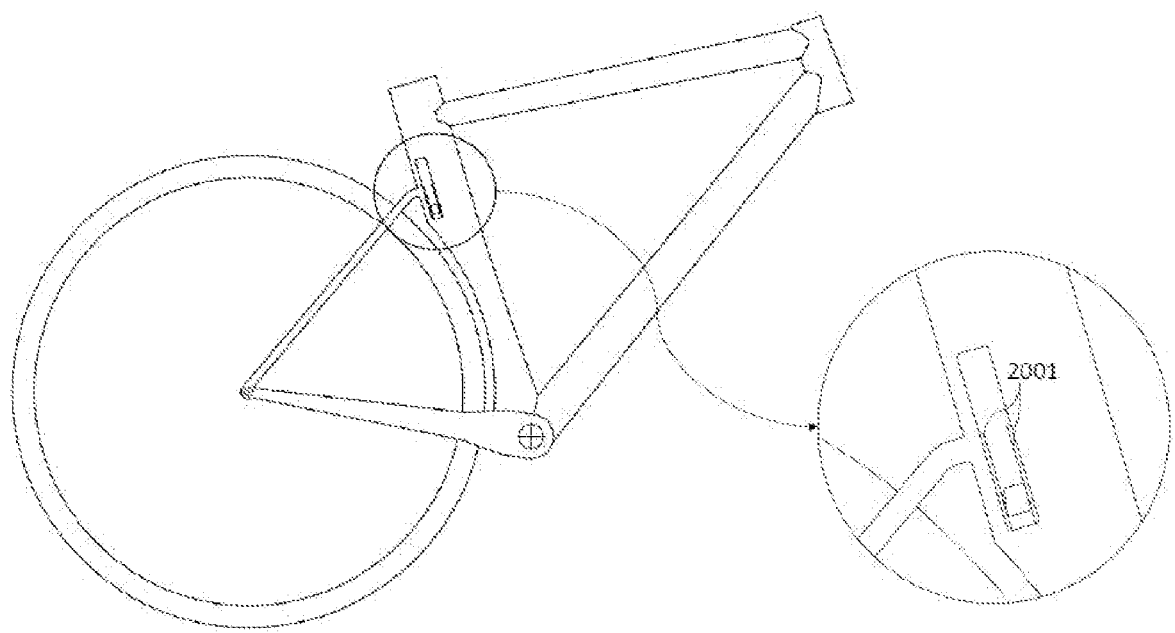

FIG. 20 shows an embodiment of said low travel rear wheel suspension system comprising said one or more stiffness adjustment inserts, said low travel rear wheel suspension system further comprises a liner material 2001 fully or partially covering surfaces of said seat tube posterior part and/or seat tube anterior part that otherwise could come into contact with each other and or into contact with one or more of said one or more stiffness adjustment inserts, said liner material can be made of, but is not limited to, a plastic or elastomer material, said liner material is defined to become a part of the body it is attached to, whether it being said seat tube posterior part or said seat tube anterior part.

Thus, protecting said seat tube posterior part and/or seat tube anterior part from friction and/or wear and potentially providing a smoother engagement of said one or more stiffness adjustment inserts.

Figure 21:
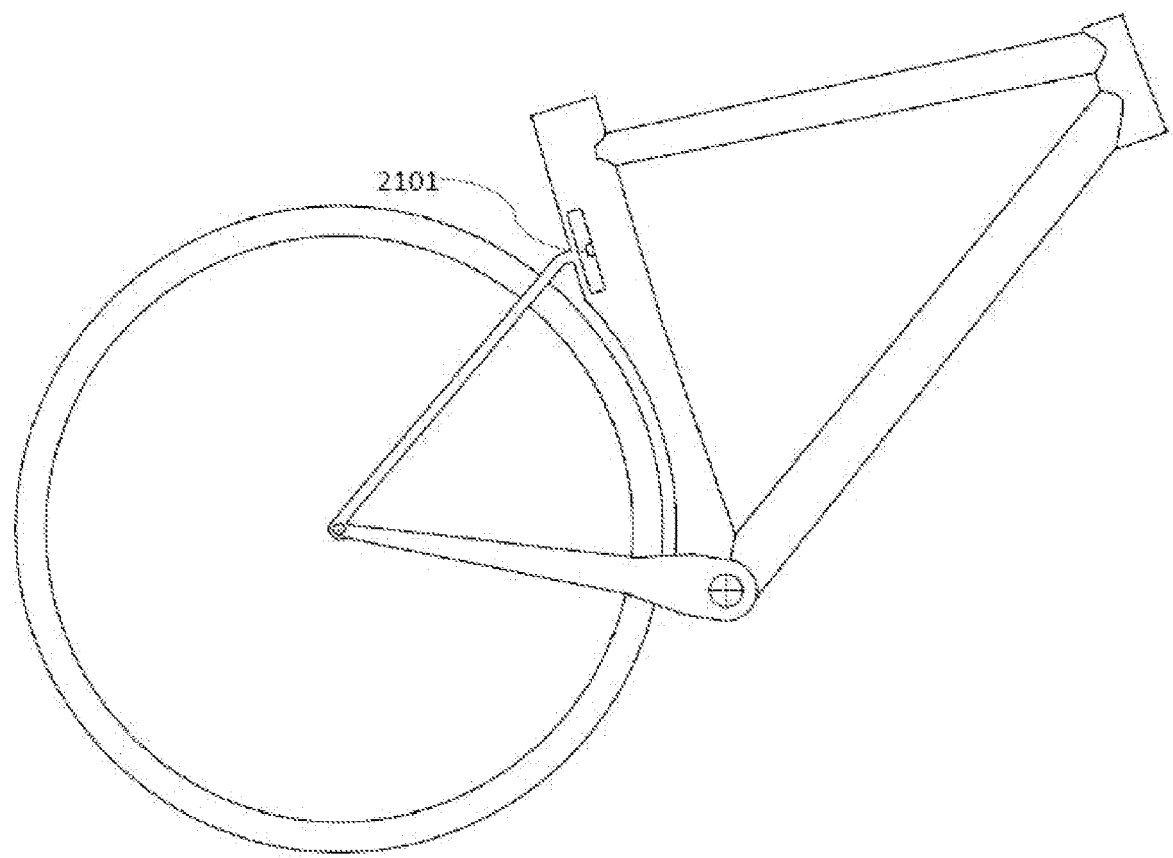
FIGS. 21-22 show embodiments with a bump stop and a damping unit.

FIG. 21 shows an embodiment of said low travel rear wheel suspension system, where an elastomer bump stop 2101 is located and secured in place in said seat tube cavity.

Thus, enabling said low travel rear wheel suspension system design with a relatively low spring rate without it resulting in harsh bottom outs.

Figure 22:
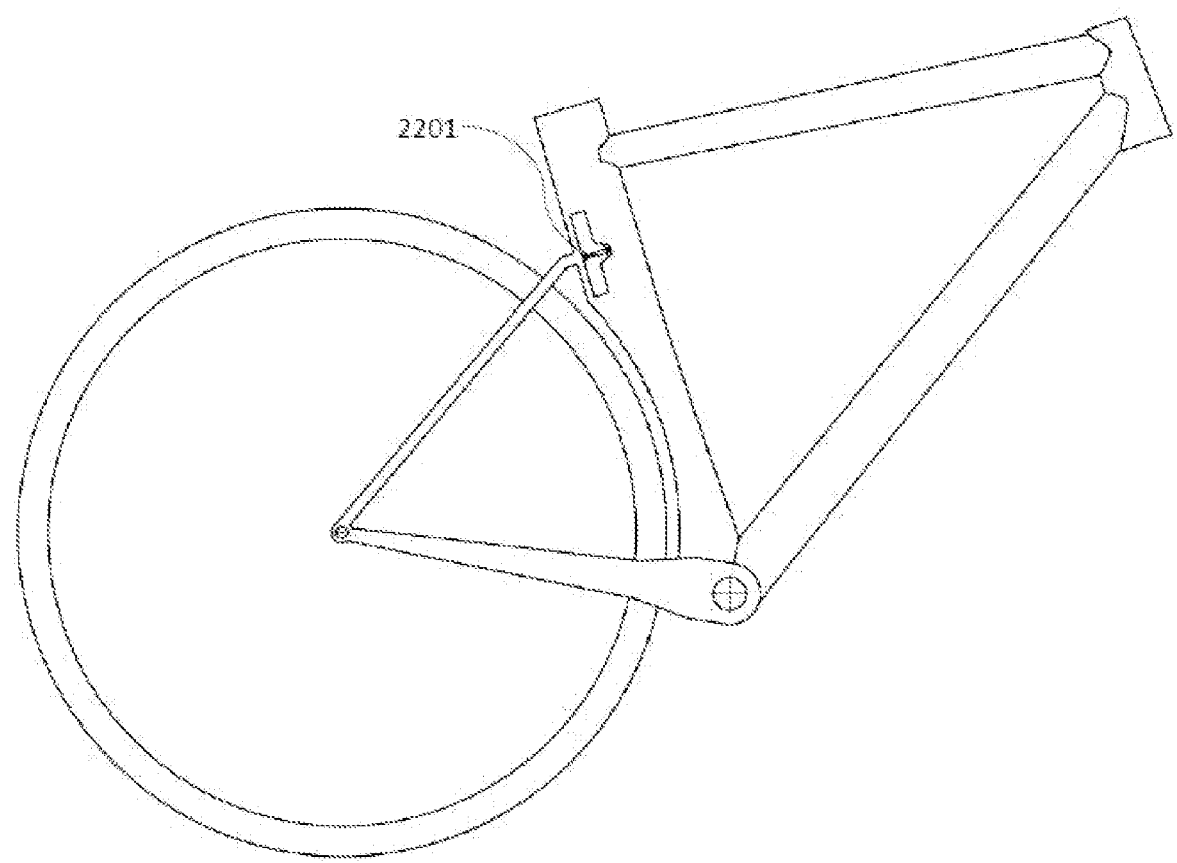

FIG. 22 shows an embodiment of said low travel rear wheel suspension system, where said low travel rear wheel suspension system further comprises a forwardly extending damper 2201 arranged from said seat tube posterior part to said seat tube anterior part.

Thus, further control of the dynamics of the suspension is provided by means of absorbing compression and/or rebound energy, this becomes desirable when said low travel rear wheel suspension system is used to achieve relatively long travel suspension.

Figure 23:
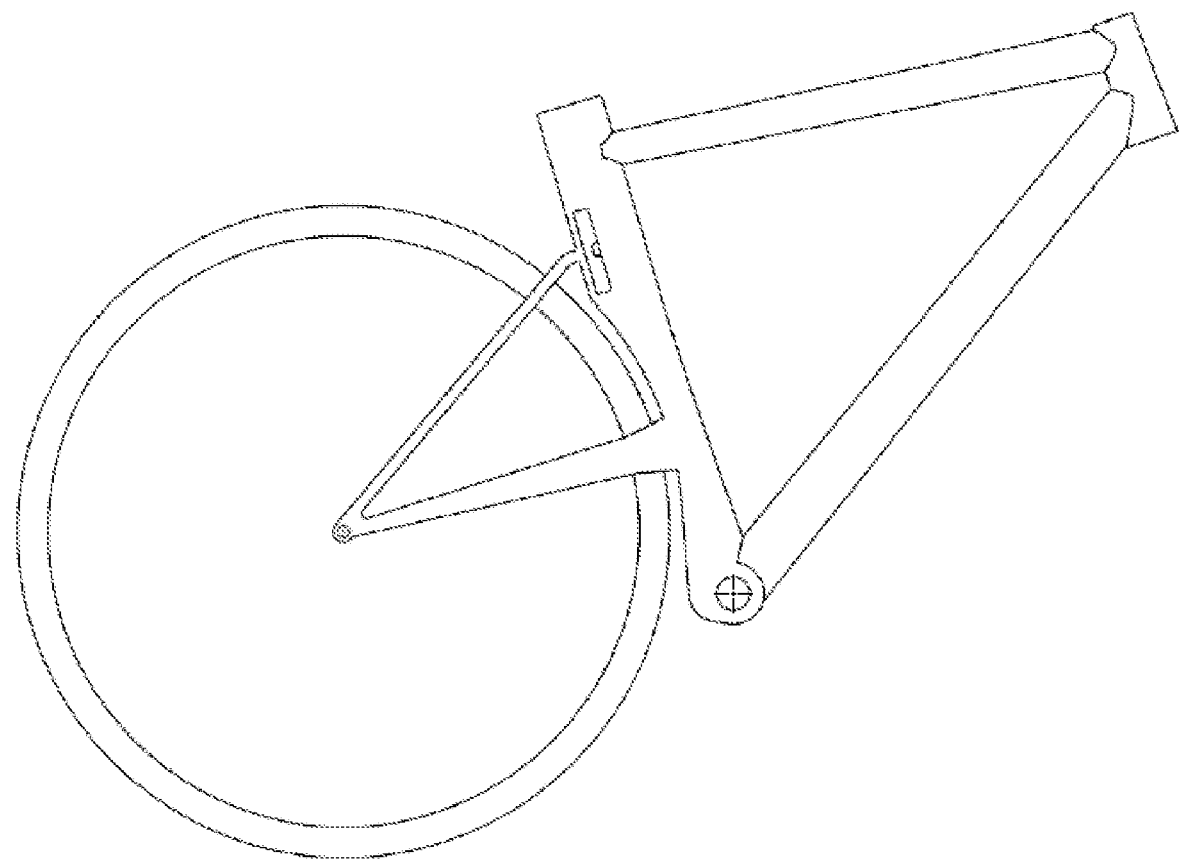
FIGS. 23-26 show some examples of how shapes can be varied within the scope of the present invention.

FIG. 23 shows an embodiment of said low travel rear wheel suspension system, where said left side flexible chainstay and said right side flexible chainstay connect to said seat tube between 100 mm and 250 mm above the rotational axis of the bottom bracket area of said bike, both said left side flexible chainstay and said right side flexible chainstay connecting to said seat tube at substantially the same height.

Thus, potentially freeing up space to fit wider tires on said bike without said tires interfering with crankset of said bike, and furthermore changing the movement path of the suspended said rear wheel so that the movement is more directed rearwards than it would otherwise be if chainstays were connected lower to said seat tube, this can help with small bump compliance and it can also help reducing pedal bob, as chain tension can work against the suspension movement of said low travel rear wheel suspension system in this configuration.

In one embodiment of said low travel rear wheel suspension system, said one or more stiffness adjustment inserts have their widths extending at least essentially between the left and right edge of said seat tube posterior part.

Thus, an adjustable low travel rear wheel suspension system is provided that does not roll excessively to the sides when the rider is pedaling or maneuvering.

Figure 24:
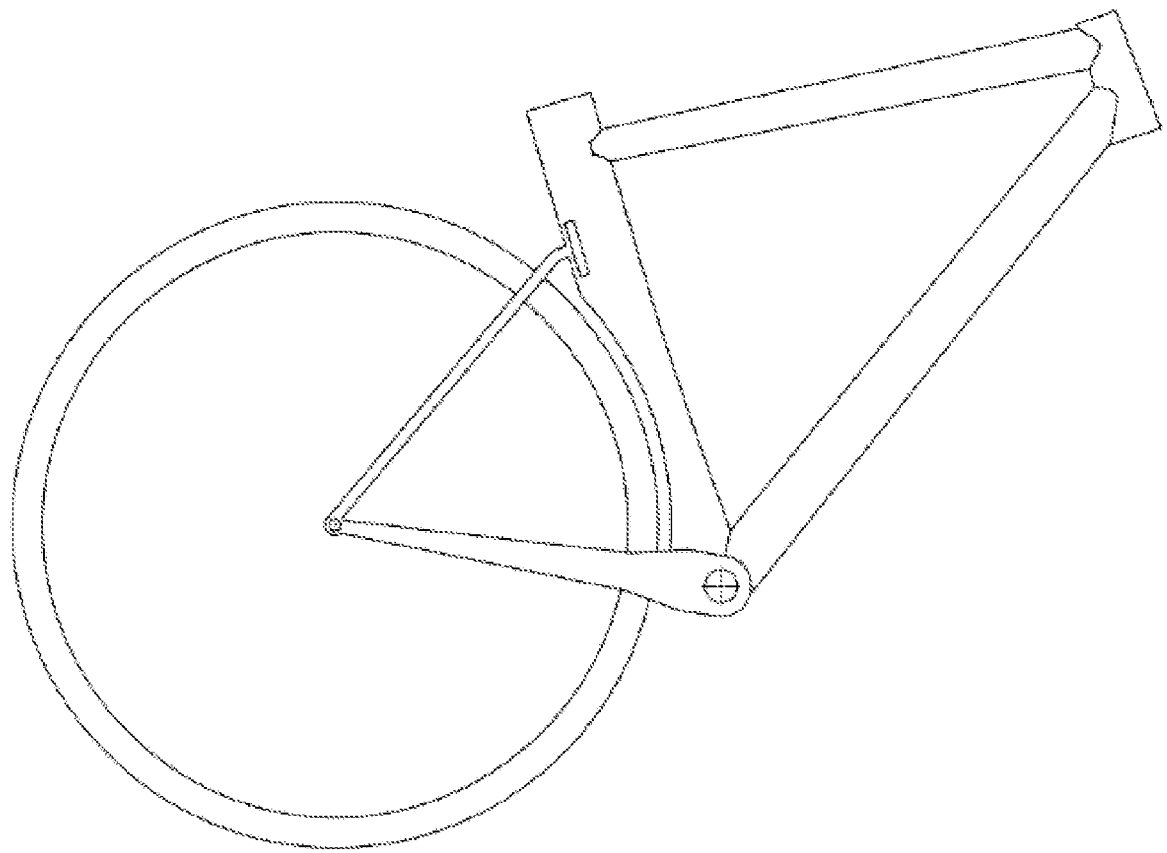

FIG. 24 shows an example of an embodiment of said low travel rear wheel suspension system, where said seat tube posterior part is relatively short, but still falling under the scope of the present invention.

Figure 25:
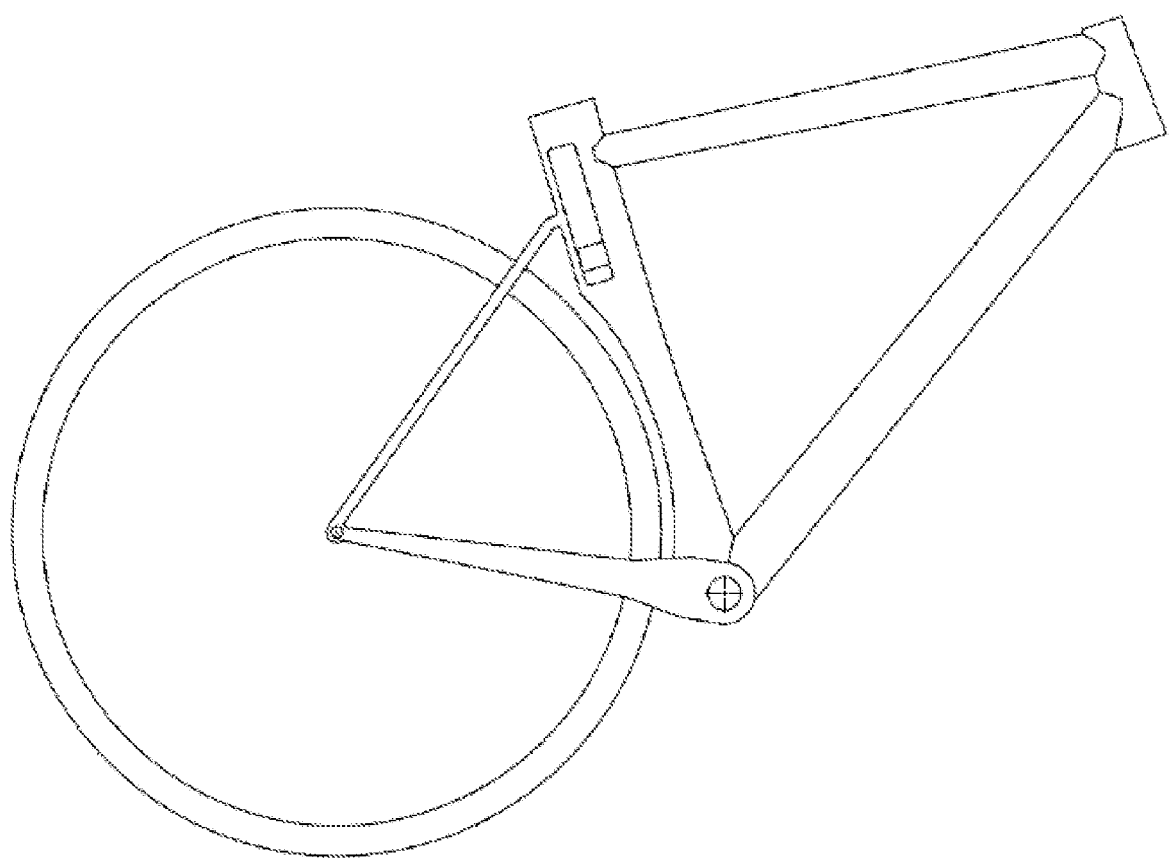

FIG. 25 shows an example of an embodiment of said low travel rear wheel suspension system, where said seat tube posterior part is relatively long, but still falling under the scope of the present invention.

Figure 26:
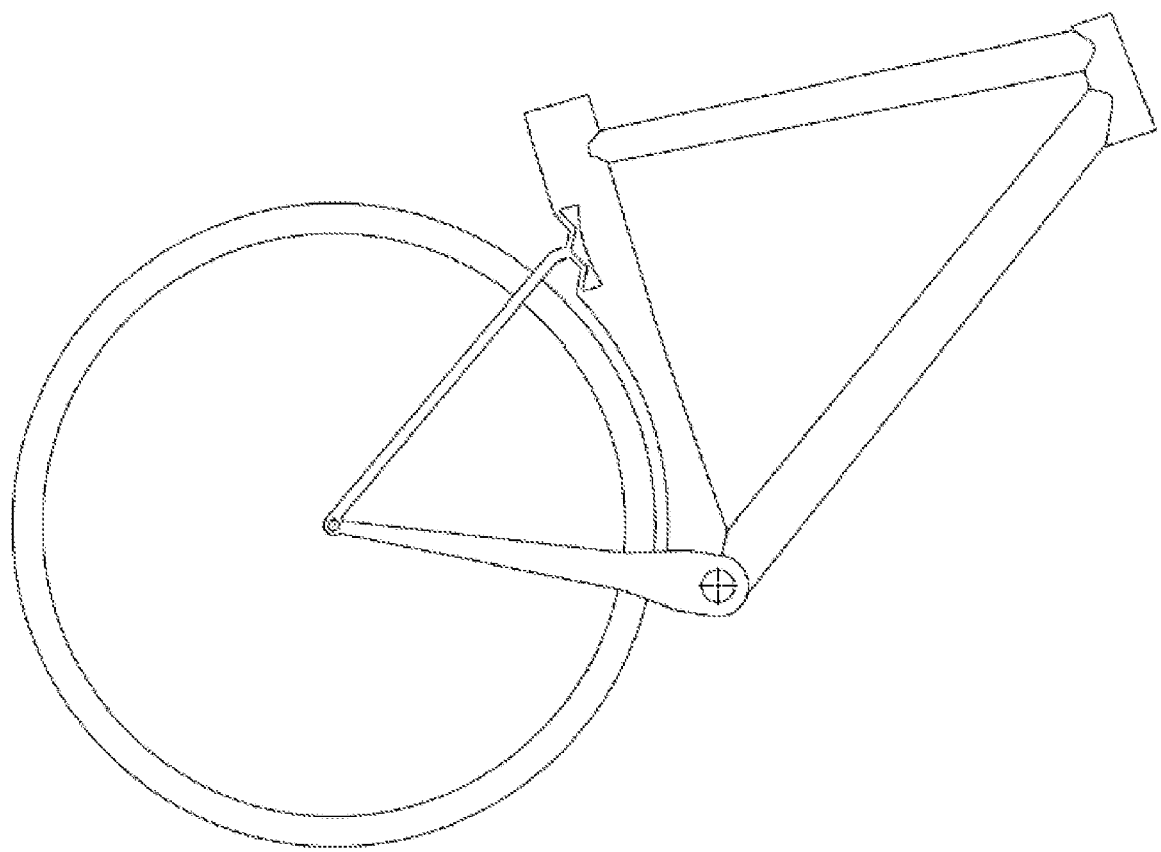

FIG. 26 shows an example of an embodiment of said low travel rear wheel suspension system, where the shape of said seat tube posterior part and said seat tube anterior part is slightly variated, but still falling under the scope of the present invention.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:
1. A bike comprising:
a rear wheel, and
a low travel rear wheel suspension system,
wherein the low travel rear wheel suspension system includes:
   a seat tube,
   a left side flexible chainstay and a right side flexible chainstay, each flexible chainstay having a front end attached to the seat tube of said bike less than 250 mm from a rotational axis of a bottom bracket shell of said bike, said bottom bracket shell defined to be a part of said seat tube, a left side seatstay and a right side seatstay, each having lower end areas connected to posterior end areas of each of said flexible chainstays, and each of said seatstays extending upwards and forward with another end connecting to the seat tube of said bike, in the area where said flexible chainstays and said seatstays connect, a set of dropouts to rotably connect to the rear wheel of said bike, said dropouts can be integral parts of said flexible chainstays and/or said seatstays, or they can be mounted to said flexible chainstays and/or said seatstays through any release fastening elements, and in the area of said seat tube connected to said seatstays, said seat tube is split up into a seat tube posterior part and a seat tube anterior part, said seatstays connecting to said seat tube posterior part, said seatstays not connecting directly to said seat tube anterior part, the area between said seat tube posterior part and said seat tube anterior part defining a seat tube cavity, said seat tube posterior part and said seat tube anterior part connecting to one another both above and below said seat tube cavity, wherein said seat tube posterior part and said seat tube anterior part are configured to allow flex of said seat tube posterior part towards said seat tube anterior part, and thus allow vertical flex of said flexible chainstays.

2. The bike according to claim 1, where said left side flexible chainstay and said right side flexible chainstay, said left side seatstay and said right side seatstay, said seat tube comprising said seat tube posterior part and said seat tube anterior part of said low travel rear wheel suspension system are all part of the same non-disassemblable body.

3. The bike according to claim 1, where said seat tube posterior part is shaped to act as a leaf spring.

4. The bike according to claim 1, where said seat tube posterior part and said seat tube anterior part are formed so that an effective spring length of said seat tube posterior part is shortened as the said low travel rear wheel suspension system compresses, by said seat tube posterior part coming into contact with said seat tube anterior part.

5. The bike according to claim 1, where said seat tube posterior part is at any given location along at least half of a lengthwise extension of said seat tube posterior part less than 20° from being parallel to a lengthwise extension of said seat tube.

6. The bike according to claim 1, where said seatstays connect to said seat tube posterior part substantially in a height center area of said seat tube posterior part.

7. The bike according to claim 1, where said low travel rear wheel suspension system further comprises one or more stiffness adjustment inserts, arranged and secured in place between said seat tube posterior part and said seat tube anterior part.

8. The bike according to claim 7, where one or more of said one or more stiffness adjustment inserts are each contacting both said seat tube posterior part and said seat tube anterior part when a rider is stationary in riding position on said bike.

9. The bike according to claim 7, where one or more of said one or more stiffness adjustment inserts are elevatable substantially perpendicularly to said seat tube posterior part, either secured to said seat tube posterior part and adjustable in how far they are elevated towards said seat tube anterior part, or secured to said seat tube anterior part and adjustable in how far they are elevated towards said seat tube posterior part, said one or more stiffness adjustment inserts being secured in place by any applicable fastening method.

10. The bike according to claim 7, where one or more of said one or more stiffness adjustment inserts are slidable upwards and downwards along and between said seat tube posterior part and said seat tube anterior part, said one or more slidable stiffness adjustment inserts being guided to prevent lateral movement, when a rider is stationary in riding position on said bike said one or more slidable stiffness adjustment inserts can either reach entirely between said seat tube posterior part and said seat tube anterior part, or reach partially between said seat tube posterior part and said seat tube anterior part.

11. The bike according to claim 10, wherein the low travel rear wheel suspension system further includes a linear actuator for sliding one or more of said one or more slidable stiffness adjustment inserts upwardly and downwardly.

12. The bike according to claim 11, where said linear actuator is arranged in a groove that runs up and down a posterior surface of said seat tube, said one or more of said one or more slidable stiffness adjustment inserts have an extrusion shaped to interact laterally with the surface of said groove.

13. The bike according to claim 7, wherein the low travel rear wheel suspension system further includes one or more stiffness adjustment inserts formed so that a thickness of said one or more of said one or more stiffness adjustment inserts at an end that is further from connection of said seatstays and said seat tube posterior part, when a rider is stationary in riding position on said bike, reaches entirely between said seat tube posterior part and said seat tube anterior part, while the thickness at another end closer to the connection of said seatstays and said seat tube posterior part lacks up to 5 mm to reach entirely between said seat tube posterior part and said seat tube anterior part.

14. The bike according to claim 1, where said seat tube posterior part is substantially parallel to an adjacent surface of said seat tube anterior part along at least one of:

a lengthwise portion of said seat tube posterior part that reaches from where said seat tube posterior part connects to remainder of said seat tube at the lower end of said seat tube cavity and from there upwards along a length of said seat tube anterior part at least 30% to where said seat tube anterior part connects to said seatstays, and, a lengthwise portion of said seat tube posterior part that reaches from where said seat tube posterior part connects to remainder of said seat tube at an upper end of said seat tube cavity and from there downwards along the length of said seat tube anterior part at least 30% to where said seat tube anterior part connects to said seatstays.

* * * * *